US012766480B2

(12) United States Patent
Wegeng et al.

(10) Patent No.: US 12,766,480 B2
(45) Date of Patent: Oct. 20, 2026

(54) METHOD AND APPARATUS FOR INDUCTIVELY HEATING MICRO- AND MESO-CHANNEL PROCESS SYSTEMS

(71) Applicant: STARS Technology Corporation, Richland, WA (US)

(72) Inventors: Robert S. Wegeng, Richland, WA (US); Dennis Walters, Richland, WA (US)

(73) Assignee: STARS Technology Corporation, Richland, WA (US)

( * ) Notice: Subject to any disclaimer, the term of this patent is extended or adjusted under 35 U.S.C. 154(b) by 0 days.

(21) Appl. No.: 18/847,509

(22) PCT Filed: Mar. 16, 2023

(86) PCT No.: PCT/US2023/064542
§ 371 (c)(1),
(2) Date: Sep. 16, 2024

(87) PCT Pub. No.: WO2023/178248
PCT Pub. Date: Sep. 21, 2023

(65) Prior Publication Data

US 2025/0205670 A1 Jun. 26, 2025

Related U.S. Application Data

(60) Provisional application No. 63/320,683, filed on Mar. 16, 2022.

(51) Int. Cl.

*B01D 53/02* (2006.01)
*B01D 53/62* (2006.01)
(Continued)

(52) U.S. Cl.
CPC .......... *B01J 19/0013* (2013.01); *B01D 53/62* (2013.01); *B01D 53/81* (2013.01); *B01J 19/2415* (2013.01);
(Continued)

(58) Field of Classification Search
CPC ......... B01D 53/04; B01J 19/127; B01J 19/08; B01J 19/248; B01J 8/00; B01J 19/2415
(Continued)

(56) References Cited

U.S. PATENT DOCUMENTS 5,811,062 A 9/1998 Wegeng
6,315,972 B1 11/2001 Mehdizadeh et al.
(Continued)

FOREIGN PATENT DOCUMENTS

CN 112265962 A 1/2021
JP 2007283236 A 11/2007
(Continued)

OTHER PUBLICATIONS

Machine translation of WO 2007048641 (Year: 2007).*
(Continued)

*Primary Examiner* — Monzer R Chorbaji
(74) *Attorney, Agent, or Firm* — Frank Rosenberg

(57) ABSTRACT

Induction heating is applied to thermochemical processes in specially adapted chemical processing units comprising heat exchange channels. Collections of components are housed in portable units adapted for easy setup and maintenance.

16 Claims, 25 Drawing Sheets

(51) Int. Cl.

| | |
|---|---|
| ***B01D 53/81*** | (2006.01) |
| ***B01J 8/08*** | (2006.01) |
| ***B01J 19/00*** | (2006.01) |
| ***B01J 19/08*** | (2006.01) |
| ***B01J 19/24*** | (2006.01) |
| ***C01B 3/384*** | (2026.01) |
| ***C01B 32/40*** | (2017.01) |
| *B01J 35/56* | (2024.01) |
| *H01F 27/28* | (2006.01) |

(52) U.S. Cl.

CPC .............. *C01B 3/384* (2013.01); *C01B 32/40* (2017.08); *B01D 2257/504* (2013.01); *B01D 2258/0283* (2013.01); *B01D 2258/06* (2013.01); *B01J 35/56* (2024.01); *B01J 2219/00076* (2013.01); *B01J 2219/00141* (2013.01); *B01J 2219/0015* (2013.01); *B01J 2219/1945* (2013.01); *C01B 2203/0233* (2013.01); *C01B 2203/0833* (2013.01); *C01B 2203/0855* (2013.01); *C01B 2203/0883* (2013.01); *C01B 2203/1241* (2013.01); *H01F 27/28* (2013.01)

(58) Field of Classification Search

USPC ............... 96/126; 95/90; 422/209, 129, 221, 422/186.04

See application file for complete search history.

(56) References Cited

U.S. PATENT DOCUMENTS

| | | | |
|---|---|---|---|
| 6,974,496 | B2 | 12/2005 | Wegeng et al. |
| 9,950,305 | B2 | 4/2018 | Wegeng et al. |
| 10,981,141 | B2 | 4/2021 | Tegrotenhuis et al. |
| 11,358,111 | B2 | 6/2022 | Zheng et al. |
| 2003/0175196 | A1 | 9/2003 | Blackwell et al. |
| 2006/0171867 | A1 | 8/2006 | Katayama |
| 2010/0143755 | A1 | 6/2010 | Fischer |
| 2013/0025192 | A1 | 1/2013 | Wegeng et al. |
| 2016/0136610 | A1 | 5/2016 | Wasserscheid et al. |
| 2023/0356175 | A1 | 11/2023 | Wegeng et al. |

FOREIGN PATENT DOCUMENTS

| | | | | | |
|---|---|---|---|---|---|
| WO | 1999001212 | A1 | | 1/1999 | |
| WO | 2003078054 | A1 | | 9/2003 | |
| WO | WO 2007/048641 | A2 | * | 5/2007 | .......... B01J 19/0093 |
| WO | WO 2007048641 | | * | 5/2007 | .......... B01J 19/0093 |
| WO | 2008030467 | A2 | | 3/2008 | |
| WO | 2015001566 | A1 | | 1/2015 | |
| WO | WO 2015/001566 | A2 | * | 1/2015 | |

OTHER PUBLICATIONS

English Translation of WO 2007/048641 A2 May 3, 2007.*

Almind, Mads Radmer et al., "Improving performance of induction-heated steam methane reforming", Catalysis Today, vol. 342 (2020) pp. 13-20.

International Preliminary Examination Report on Patentability from International Application No. PCT/US2023/064542 dated Sep. 10, 2024.

Written Opinion of the International Search Authority from International Application No. PCT/US2023/064542 dated Jun. 14, 2023.

International Search Report from International Application No. PCT/US2023/064542 dated Jun. 14, 2023.

Final Office Action in U.S. Appl. No. 18/245,354 dated Mar. 6, 2026.

Almind, M.R et al., "Improving performance of induction-heated steam methane reforming", Catalysis Today, vol. 342 (2019) pp. 13-20.

Machine Translation of Japanese Patent Application JP 2007283236 A.

Extended European Search Report in European patent application No. EP23771670.9 dated Jul. 1, 2026.

* cited by examiner

Cross-Section View of Cylindrical Torroidal Receiver/Reactor

SMR Reactor With Nickel-Coated Co/Fe Wedges Attached To Promote Inductive Coupling To Commercial Induction Heating System

METHOD AND APPARATUS FOR INDUCTIVELY HEATING MICRO- AND MESO-CHANNEL PROCESS SYSTEMS

RELATED APPLICATIONS

This application is a National Stage entry of International Patent Application. No. PCT/US23/64542, filed on 16 Mar. 2023 which claims the priority benefit of U.S. Provisional Patent Application Ser. No. 63/320,683 filed 16 Mar. 2022.

INTRODUCTION

In the past, micro- and meso-channel units requiring heat have either incorporated fluid passages that transport a preheated fluid or create heat within the passage-such as through an exothermic chemical reaction—or they have received heat through external walls of the unit. Inducing the heat to be generated within and/or in close proximity to the channels requiring heating is advantageous since it reduces the volume needed for alternate channels and also reduces the heat transfer inefficiency/irreversibility of conducting heat through the structure of the unit, resulting in a system that is process intensive and thermodynamically more efficient than alternatives.

The three patent documents discussed below are incorporated by reference in full, including definitions for terms used herein.

U.S. Pat. No. 9,950,305, entitled "Solar thermochemical processing system and method," presents the design of a micro-/meso-channel reactor that uses concentrated solar energy to drive high temperature chemical reactions, such as methane steam reforming or the reverse-water gas shift reaction. The reactor itself is a pancake-shaped unit where reactants are transported through radial channels from the center of the reactor disk to the edges, then back again through additional heat exchange channels that flow in a counterflow direction to the reaction channels. Heat is added to the system for the endothermic reaction by directing the radiant energy from a parabolic dish concentrator.

US Published Patent Application US20200298197 entitled "Reactor Assemblies and Methods of Performing Reaction," presents the design of an improved micro-/meso-channel reactor where the outward-flowing reaction channels are configured in a curved or spiral arrangement and/or the inward flowing heat exchange channels are configured in a similar arrangement achieving counter-cross flow operation. Straight channels may also accomplish counter-cross flow operation, as noted in FIG. 1B. The major improvement through counter-cross flow operation in the system is that the channels spread heat in a substantially more effective manner than the reactor in the first patent document, thereby mitigating nonuniform heat from the dish concentrator, reducing the magnitude of hot spots on the reactor surface and their potential negative impact on fluid flow distribution within the reactor.

US Published Patent Application US20200001265 entitled "Enhanced Microchannel or Mesochannel Devices and Methods of Additively Manufacturing the Same," presents 3D methods of printing micro- and meso-channel reactors, including design improvements that are enabled by 3D printing, also called additive manufacturing. 3D printing provides advantages for micro- and meso-channel units, including the opportunity to vary the magnetic properties of the structure by varying the composition of the metal powder or by inserting structures (e.g., flux concentrators) as or after the unit is printed. This is especially intriguing as it allows one to design structures that direct and/or concentrate an alternating Electromagnetic Field (EMF) to points of interest-including the use of constructive or destructive interference-so that heat is preferentially provided to portions of the structure. This patent application describes the combination of the counter-cross flow design from the second patent document with the methods of the third patent document, further combined and adapted to efficiently incorporate inductive heating as is presented in this patent application.

SUMMARY OF THE INVENTION

The invention provides methods, systems, and apparatus for inductively heating micro- and meso-channel reactors, heat exchangers, vaporizers, and separations units.

The method comprises of inducing an alternating electromagnetic field within the micro- or meso-channel device or within an inductive adaptor that is close proximity, or better yet in electrical and/or thermal contact with the micro- or meso-channel device, creating eddy currents in the inductive adaptor and/or the micro- or meso-channel device, which produce heat through joule heating. If the material being heated is ferromagnetic, heat is also generated through magnetic hysteresis losses. In a simple version, it is similar to cooktop stove inductive heaters, but in more effective units it preferentially directs heat to fluid channels where the heat is needed.

The invention also provides a chemical transformer. A chemical transformer is analogous to an electrical transformer in that it connects to a gas grid (e.g., the natural gas grid) and perhaps an electrical grid, and performs transformations that enable better transmission and distribution, storage or use of the molecules that are the subject of the gas grid. When connected to an electrical grid it also converts electrical energy to chemical energy which can subsequently be restored to electrical energy in fuel cells or other power generators, thus providing a convenient means of energy storage. The chemical transformer is a process-intensive, chemical process plant that gains efficiency and productivity advantages through the inclusion of micro- and meso-channel reactors, heat exchangers and separators, thus gaining a reduced volume and footprint compared to conventional energy conversion and chemical process technologies. It also gains advantages by being mass-producible, including through the use of assembly-line manufacturing methods, and available to be placed near the point where the chemical products are needed The invention includes any of the components, methods of making or assembling apparatus, kits that can be assembled to make apparatus, or methods or systems described above. Systems may include both solid components as well as fluids and any selected conditions (temperatures, pressures, electric or magnetic fields, etc.) within or around the solid components. The invention may include systems or methods of converting or otherwise changing the physical properties of chemicals or chemical compounds. The components or apparatus can be any combination of the components described here. The invention can be alternatively or additionally be described in terms of properties, for example possessing at least the values described here, or within ±10%, or ±20%, or ±30%.

In one aspect, the invention provides a chemical processor, comprising, in order from top to bottom: a cooling plate; a layer comprising a plurality of flux concentrators; a process layer having a top wall that is adapted to heat in response to an alternating magnetic field, a bottom wall opposite the top wall, and side walls disposed between the top and bottom walls; the process layer comprising a channel adapted for fluid flow and an inlet and outlet adapted for fluid flow into and out of the process layer; a heat transfer layer adjacent the bottom wall of the process layer; the heat transfer layer having a top wall, a bottom wall opposite the top wall, and side walls disposed between the top and bottom walls; the heat transfer layer comprising a channel adapted for fluid flow and an inlet and an outlet such that a fluid can flow into and out of the heat transfer layer; wherein the outlet of the process layer is connected to the inlet of the heat transfer layer such that a fluid can flow out of the process layer and into the heat transfer layer; wherein the bottom wall of the process layer is the top wall of the heat transfer layer or where the walls are in thermal contact; and an inductor configured to generate an alternating magnetic field in the top wall of the process layer. Typically, the reactor has a sandwich configuration further comprising a layer comprising cobalt iron flux concentrators, an insulation layer, a layer comprising a plurality of flux concentrators, and a cooling plate.

In any of its aspects, the invention can be further characterized by one or any combination of the following: the process layer comprises a plurality of microchannels or mesochannels and/or the heat transfer layer comprises a plurality of microchannels or mesochannels; comprising an insulation layer disposed between the inductor and the process layer; wherein a layer comprising a ferromagnetic material is disposed between the insulation layer and the process layer; wherein the ferromagnetic material comprises a cobalt iron alloy; during operation, flow in the heat transfer layer can be counter to the direction of flow in the process layer; wherein, during operation, flow is cross flow such that the plurality of microchannels or mesochannels in the heat transfer layer overlap with the plurality of microchannels or mesochannels in the process layer such that the channels cross, so that flow is both counter-flow and cross-flow; wherein the inductor is a pancake induction coil, or a toroidal induction coil; further comprising an induction enhancer; further comprising an induction susceptor placed within the process channel; wherein the top wall is ferrimagnetic or ferromagnetic at room temperature; wherein the top wall is paramagnetic at room temperature; further comprising a recuperative heat exchanger in which there is heat transfer between the process stream flowing toward the process layer and the product stream flowing away from the heat transfer layer; wherein the recuperative heat exchanger is a microchannel recuperative heat exchanger; wherein the flux concentrators in the layer comprising a plurality of flux concentrators comprise a coating of a thermally conductive material; wherein the layer comprising a plurality of flux concentrators comprises a plurality of flux concentrators having a relatively high thermal conductivity alternating with a plurality of ferrite flux concentrators having a thermal conductivity that is at least 10% less (or at least 20% less or at least 50% less) by mass than the flux concentrators having a relatively high thermal conductivity; wherein the cooling plate is sandwiched between the plurality of flux concentrators and a cooling coil; wherein the cobalt iron flux concentrators are coated with a metallic or ceramic oxidation-resistant coating; wherein the layer of cobalt iron flux concentrators comprises a brazing layer having a thickness of 100 μm or less or 50 μm or less or in the range of 10 to 100 μm; wherein the layer of cobalt iron flux concentrators comprises a nickel braze, preferably BNi7; wherein the layer of insulation has a thickness of 2 cm or less, preferably 1 cm or less, or in the range of 0.5 to 2 cm.

The invention also includes a chemical transformer comprising the chemical processor.

In another aspect, the invention provides a method of conducting an endothermic chemical process, comprising: passing a process stream into the apparatus of any of the above claims. Preferably, the method has an electrical-to-chemical efficiency of at least 70% or at least 80% or in the range of 70 or 80 to about 85% or an electrical-to-thermal efficiency of at least 50%.

The invention may further be characterized by one or more of the following: wherein the endothermic chemical process is a chemical reaction; wherein the chemical process is a catalytic chemical reaction; wherein the chemical process is methane steam reforming; wherein the chemical reaction comprises a reforming reaction or a reverse-water-gas shift reaction; wherein the endothermic chemical process comprises vaporizing the product stream; further comprising a step of exchanging heat between the process stream, prior to entering the process layer, and a product stream that has left the heat exchange layer; wherein the endothermic chemical process comprises a chemical separation; wherein the chemical separation comprises distillation or sorption; wherein the heat transfer fluid comprises the reaction products of a chemical reaction in the process layer; wherein the alternating magnetic field alternates at a frequency between 1 and 100 kHz; wherein the alternating magnetic field alternates at a frequency between 1 and 50 kHz.

In another aspect, the invention provides a toroidal chemical processor, comprising: a toroidal-shaped processor defined by toroidal-shaped reactor wall adapted to heat in response to an alternating magnetic field and comprising an inductor coil disposed around the toroidal-shaped reactor wall; a chemical processing channel disposed inside the toroidal-shaped reactor wall; and the chemical processing channel comprising an inlet and an outlet and comprising a circular opening in the center of the toroidal-shaped reactor wall wherein the diameter of the circular opening is at least twice as large as the width of the chemical processing channel.

Glossary

As is standard patent terminology, "comprising" means "including" and neither of these terms exclude the presence of additional or plural components. In alternative embodiments, the term "comprising" can be replaced by the more restrictive phrases "consisting essentially of" or "consisting of."

A "microchannel" is a channel having at least one internal dimension (wall-to-wall, not counting catalyst) of 1 mm or less, and greater than 1 μm (preferably greater than 10 μm), and in some embodiments 50 to 500 μm; preferably a microchannel remains within these dimensions for a length of at least 1 cm, preferably at least 10 cm. In some embodiments, in the range of 5 to 100 cm in length, and in some embodiments in the range of 10 to 60 cm. Microchannels are also defined by the presence of at least one inlet that is distinct from at least one outlet. Microchannels are not merely channels through zeolites or porous materials. The length of a microchannel corresponds to the direction of flow through the microchannel. Microchannel height and width are substantially perpendicular to the direction of flow of through the channel. Mesochannels are similarly defined except having an internal dimension of 1 mm to 1 cm. Typically, devices comprise multiple micro- or mesochannels that share a common header and a common footer.

Although some devices have a single header and single footer; a microchannel device can have multiple headers and multiple footers. The volume of a channel or manifold is based on internal space. Channel walls are not included in the volume calculation. Catalyst can be in the form of particulate or in the form of a porous solid such as a wall coating or a porous body that is inserted into a reaction channel (a "catalyst insert"). In the present invention, the support of a catalyst insert can be a material that heats in the presence of an alternating magnetic field. Particulate refers to particles such as catalyst particles that fit within a micro- or mesochannel. Preferably, the particles (if present) have a size (largest dimension) of 2 mm or less, in some embodiments, 1 mm or less. Particle size can be measured by sieves or microscopy or other appropriate techniques. For relatively larger particles, sieving is used. The particulate may be catalyst, adsorbent, or inert material.

In some preferred configurations, the catalyst (either for steam reforming or other chemical reactions) includes an underlying large pore substrate. Examples of preferred large pore substrates include commercially available metal foams or metal felts. Prior to depositing any coatings, a large pore substrate has a porosity of at least 5%, more preferably 30 to 99%, and still more preferably 70 to 98%. In some preferred embodiments, a large pore substrate has a volumetric average pore size, as measured by BET, of 0.1 μm or greater, more preferably between 1 and 500 μm. Preferred forms of porous substrates are foams and felts and these are preferably made of a thermally stable and conductive material, preferably a metal such as stainless steel or FeCrAlY alloy. These porous substrates can be thin, such as between 0.1 and 1 cm. Foams are continuous structures with continuous walls defining pores throughout the structure. Alternatively, the catalyst may take any conventional form such as a powder or pellet.

A catalyst with a large pores preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. A catalyst insert preferably has a height of 1 cm or less, in some embodiments a height and width of 0.1 to 1.0 cm. In some embodiments, the porous insert occupies at least 60%, in some embodiments at least 90%, of a cross-sectional area of a microchannel. In an alternative preferred embodiment, the catalyst is a coating (such as a washcoat) of material within a reaction channel or channels.

In many embodiments, the inductor provides heat to a heterogeneous catalyst for the endothermic steam methane reforming reaction. Other endothermic processes are also anticipated including other endothermic chemical reactions, such as dry reforming of methane with $CO_2$ or the reverse water gas shift reaction. Preferably, the heat exchange function achieves a temperature trajectory down the length of the reaction channel that encourages greater chemical conversion. Other examples are sorption processes for heat pumps or chemical separations. For example, solar heat pumps transfer heat from a lower temperature to a hotter temperature using absorption (liquid solvent) or adsorbent (solid sorbent) heat pump cycles. An example is replacing the catalyst in the above invention with a solid sorbent that adsorbs refrigerant at low temperature and pressure and desorbs at higher temperature and pressure using solar energy. Applications include building heating ventilation and air condition (HVAC) and refrigeration. Similarly, the sorbent can be used for chemical separations in a thermal swing adsorption (TSA) process or a thermally-enhanced, pressure swing adsorption (PSA) process. One application would be capturing carbon dioxide from the atmosphere, from syngas production systems such as the $H_2$ production/steam reforming application described herein, power plant effluents, or other potential sources.

Catalyzed chemical reactions are very well known and appropriate conditions and catalyst are very well known and do not need to be described here; it is sufficient to identify catalysts as reforming catalysts, or Sabatier catalysts (commonly Ni or Ru/Al2O3), ammonia synthesis (commonly Ru, or iron oxide, or Co—Mo—N), or reverse-water-gas shift reaction (common catalysts comprise oxides of iron, chromium, and optionally magnesium).

In some preferred embodiments, the invention converts methane or other alkane or mix of hydrocarbons to hydrogen by steam or dry reforming. A steam reforming process requires a hydrocarbon (or hydrocarbons) and steam ($H_2O$). A reactant mixture can include other components such as $CO_2$ or nonreactive diluents such as nitrogen or other inert gases. In some preferred processes, the reaction stream consists essentially of hydrocarbon and steam. In some preferred embodiments, the steam to carbon ratio in a reactant stream is 5 to 1 to 1 to 1, and in some embodiments 3 to 1 or less. Hydrocarbons include: alkanes, alkenes, alcohols, aromatics, and combinations thereof. A hydrocarbon can be natural gas. Preferred alkanes are C1-C10 alkanes, such as methane, ethane, propane, butane, and isooctane. A steam reforming catalyst preferably comprises one or more of the following catalytically active materials: ruthenium, rhodium, iridium, nickel, palladium, platinum, and combinations thereof. Rhodium is particularly preferred. In some preferred embodiments, the catalyst (including all support materials) contains 0.5 to 10 weight percent Rh, more preferably 1 to 3 wt % Rh. The catalyst may also contains an alumina support for the catalytically active materials. An "alumina support" contains aluminum atoms bonded to oxygen atoms, and additional elements can be present.

Preferably, the alumina support comprises stabilizing element or elements that improve the stability of the catalyst in hydrothermal conditions. Examples of stabilizing elements are Mg, Ba, La, and Y, and combinations of these. Preferably, the catalytically active materials (such as Rh) are present in the form of small particles on the surface of an alumina support. The steam reforming reaction is preferably carried out at more than 400° C., more preferably 500-1000° C., and still more preferably 650-900° C. The reaction can be run over a broad pressure range from sub-ambient to very high, in some embodiments the process is conducted at a pressure of from 10 atm to 30 atm, more preferably 12 atm to 25 atm. The $H_2O$ partial pressure is preferably at least 0.2 atm, in some embodiments at least 2 atm, and in some embodiments in the range of 5 atm to 20 atm.

A channel containing a catalyst is a reaction channel. More generally, a reaction channel is a channel in which a reaction occurs. Reaction channel walls are preferably made of an iron-based alloy such as steel, or a Ni-, Co- or Fe-based superalloy such as various alloys Haynes. The choice of material for the walls of the reaction channel may depend on the reaction for which the reactor is intended. In some embodiments, the reaction chamber walls are comprised of a stainless steel or Inconel® which is durable and has good thermal conductivity. Typically, reaction channel (typically, tube) walls are formed of the material that provides the primary structural support for the microchannel apparatus.

The invention also includes methods of conducting unit operations within the apparatus described herein.

"Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

Heat exchange fluids may flow through heat transfer channels (preferably micro- or mesochannels) adjacent to process channels (preferably reaction micro- or mesochannels), and can be gases or liquids or biphasic materials and in preferred embodiments, the heat exchange fluid is a product stream used to recuperate heat generated in the reaction channel.

Flux concentrators improve the electromagnetic coupling between the wall surface and the current-carrying region of the inductor. Typically, flux concentrators are ferromagnetic or ferrimagnetic materials, such as ferrites.

Induction enhancer is a material or a combination of materials with a modest or high magnetic susceptibility that is affixed to or placed in close proximity to a region of a chemical processor (preferably the micro- or meso-process channels) to be heated by induction. The enhancer includes at least one ferromagnetic material at the desired temperature of the process. A chemical process unit that is inductively heated may incorporate one or a plurality of induction enhancers.

A "thermochemical processor" is an apparatus or component of a system in which a process stream is subjected to a thermochemical process such as a reaction (such as steam reforming), separation, or vaporization. At least a portion of the process stream undergoes a chemical reaction, change in sensible energy, change of state, or change of purity or concentration. In embodiments of the invention where induction heating is used, the process is endothermic or comprises an endothermic phase.

DETAILED DESCRIPTION OF THE INVENTION

Chemical reactors for reactions that are conducted at high temperature, such as methane steam reforming, need to be built of materials that can withstand high temperatures and thermal expansion at varying temperatures. Typically, these reactors are made of high temperature superalloys such as Haynes 282. Haynes 282 is believed to be, at best, weakly paramagnetic, with a relative magnetic permeability that is close to 1, which is the relative magnetic permeability of a vacuum. This means that Haynes will not provide very much intensification of the magnetic field on its own. We have found that some commercial induction cooktop heaters refuse to turn on with Haynes 282 or Inconel 625 as their internal sensors do not register an acceptable receiver material. However, some others, with different electronics and, presumably, different detection algorithms, do not refuse to turn on and, with some effort, we have been successful in gaining high heating rates with Haynes 282. It was believed by some experts that Haynes 282 would be more difficult to inductively heat than aluminum, which has very low electrical resistivity and therefore might not be expected to provide sufficient Joule Heating. Surprisingly, however, we found that that Haynes 282 heats in a suitable alternating magnetic field. In addition, we found that the use of an induction enhancer provides an additional coupling advantage such that all of the tested induction heaters operated effectively and allowed us to move the process unit further from the pancake inductor; thus enabling a high temperature reaction without damaging the pancake inductor.

The addition of inductive heating to a solar-heated chemical process unit, thus producing a solar-electric hybrid, can create a substantial productivity advantage for a solar thermal or thermochemical process which otherwise might be limited by the intermittent availability of sunlight. In addition, it allows standalone operation with no solar concentrator or other source of heat.

Figure 1:
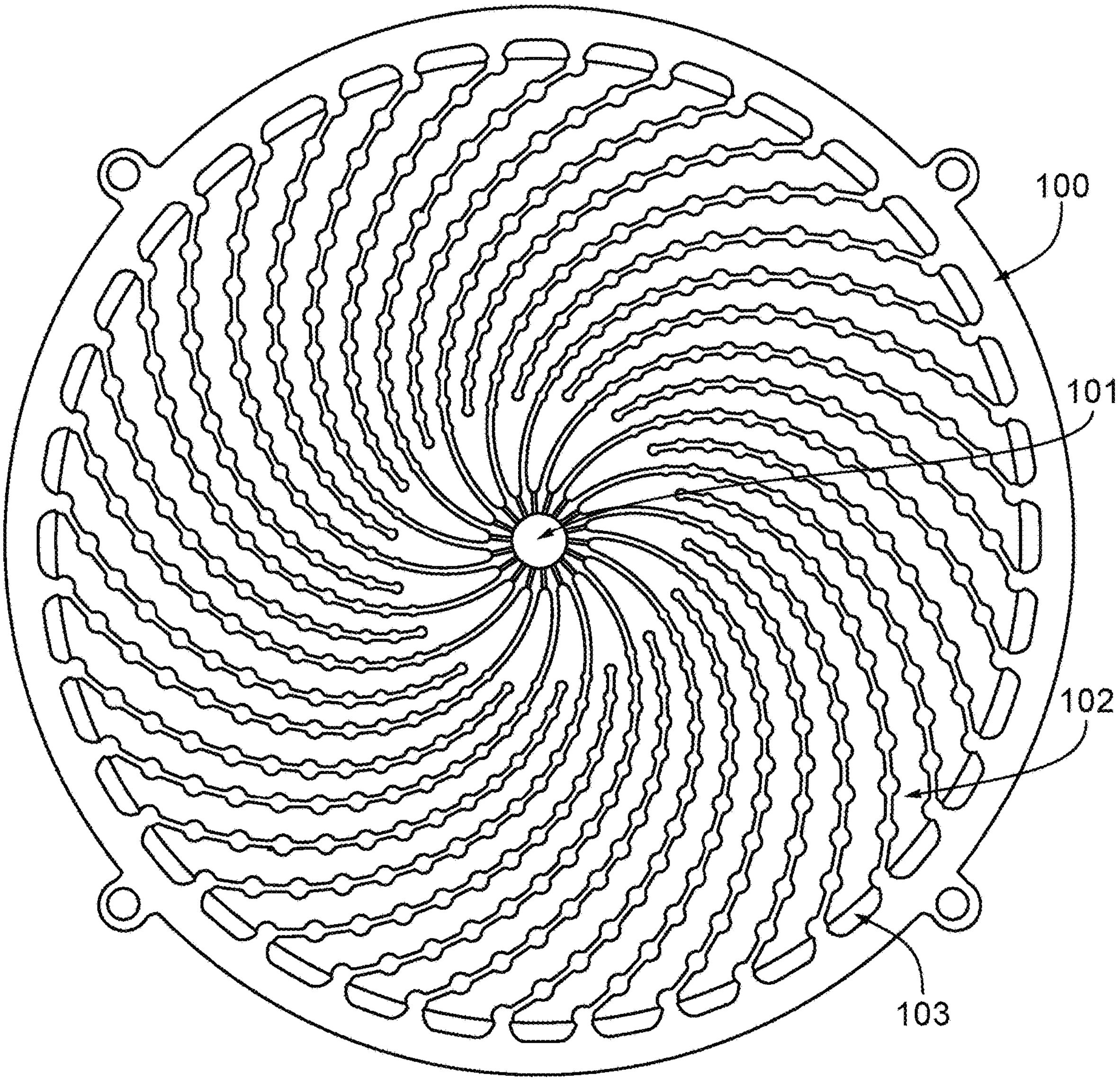
FIG. 1 shows a top-down view of a spiral process layer comprising a plurality of spiral process channels.

FIG. 1 shows the catalyst level of the counter-cross flow reactor (100). The reaction channels containing catalyst (102) for steam-methane reforming contain fecralloy foam in which rhodium is impregnated and calcinated as discussed in U.S. Pat. No. 9,950,305. As discussed in the second patent document, reactants enter this level at the center (101) of the plate, pass in a generally-radial direction to slots (reaction channel outlets 103) in the perimeter, then return to the center in another set of curved-spiral channels. This allows the reaction product gases to give up heat to the catalyst channels through counter-cross flow heat transfer and accomplishes thermal spreading.

Figure 1B:
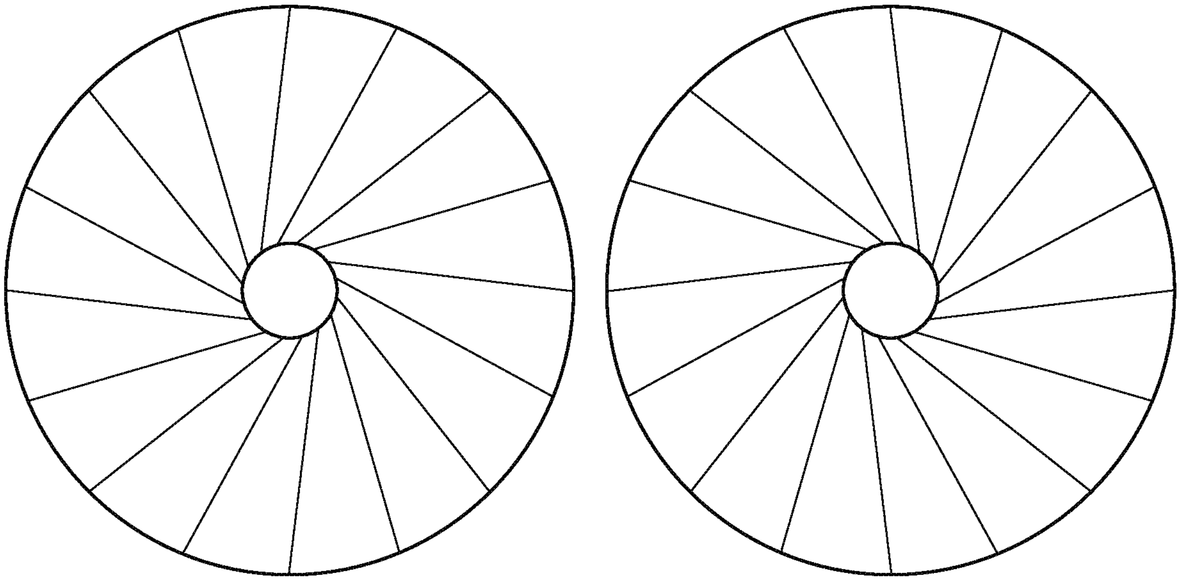
FIG. 1B illustrates an alternative approach to channel design.

FIG. 1B demonstrates an alternative approach to channel design where straight channels are used, but which when stacked or fabricated as layers also allows counter-cross flow heat exchange, likewise accomplishing thermal spreading. Stacked, or manufactured on top of each other, straight (linear) channels are also capable of providing the heat transfer advantages of counter-cross flow, enabling thermal spreading in a circumferential direction. In this case, channel walls are represented by straight lines, rather than curves/spirals as in FIG. 1, which are offset near the center of each pancake reactor. The invention includes this type of reactor configuration wherein counterflow channels with straight walls define flow paths that overlap at least two or at least three flow paths in one adjacent layer.

Figure 2A:
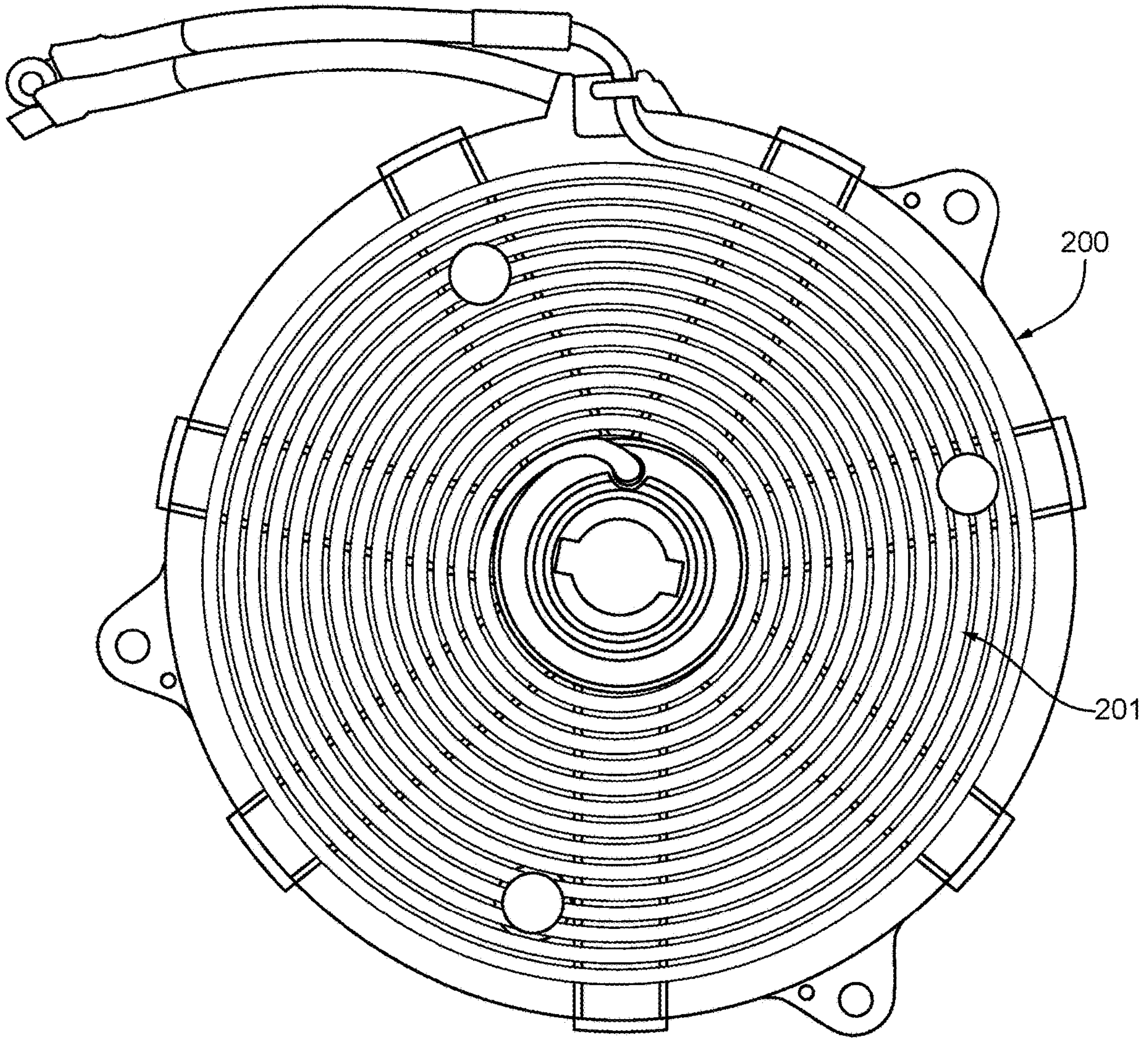
FIGS. 2A and 2B show top- and bottom-views of a pancake inductor.
Figure 2B:
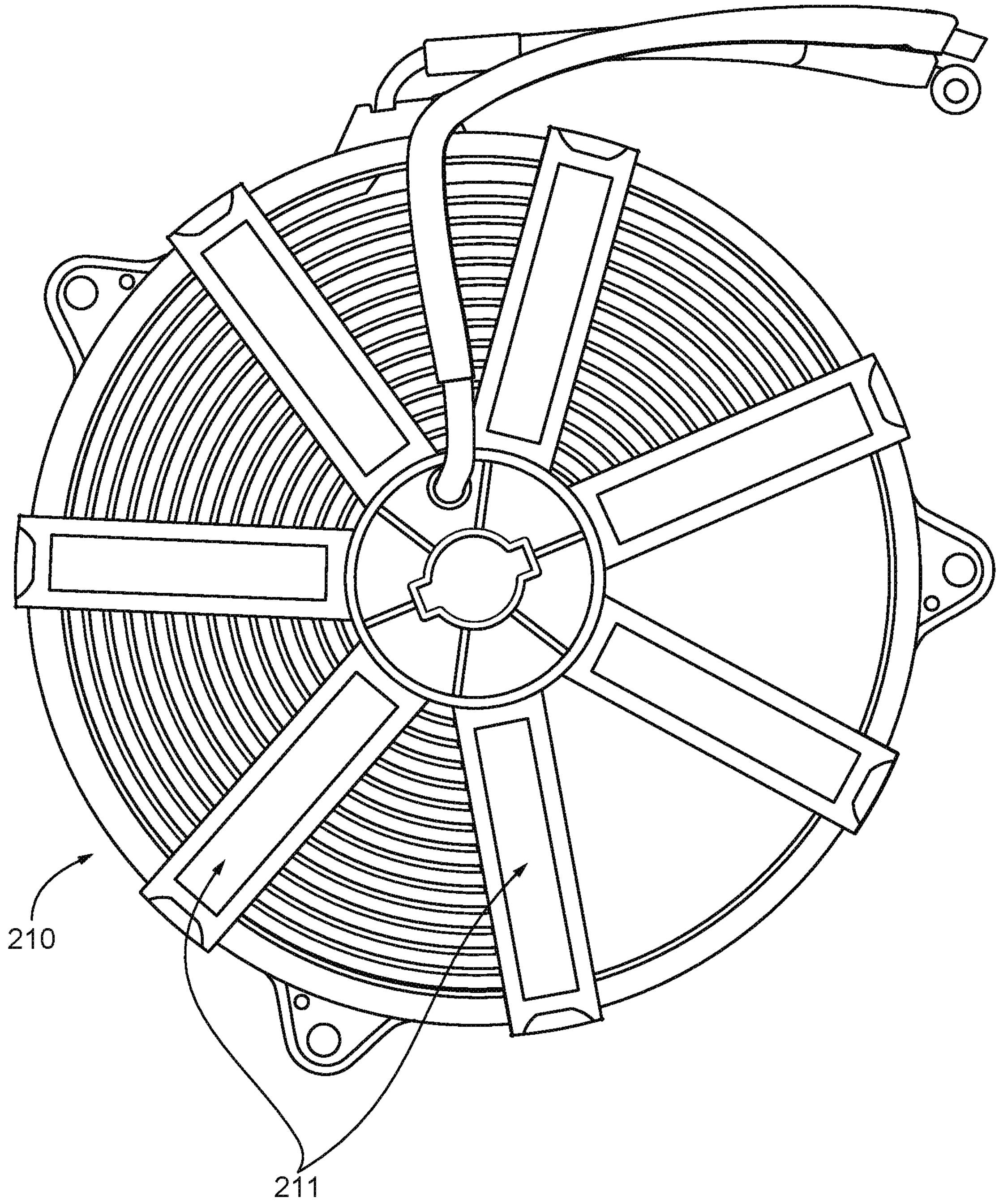

FIGS. 2A and 2B provide pictures of both sides (200 and 210) of a conventional pancake coil that acts as the primary core of an induction heating unit. Induction heating can be thought of as similar to an electrical transformer with the primary coil as the primary and the receiving unit as the secondary—which here is an endothermic reactor, heat exchanger or a separation unit, such as an adsorption media, or a ferromagnetic material placed in the channel such as a nickel-cobalt, AlNiCo, or cobalt-iron, or other flux concentrating material with Curie temperature characteristics suitable for the unit chemical operation of interest. The pictured unit has twenty turns of the coil using Litz wire (201), where many insulated copper strands are woven together. The major benefit of using Litz wire is that it allows higher current densities over water-cooled copper tubing. This enables greater heating power densities which are desirable in the micro- and meso-channel reactors where endothermic reactions are taking place. Ferrite flux concentrators are shown at 211.

In induction energy transfer, the current that is generated within the receiving unit—for example, a secondary coil of an electrical transformer or a reactor to be heated—is equal to the ratio of the number of turns in the primary to the number of turns in the secondary. In most cases, the effective number of turns in a micro- or meso-channel unit can be taken to be 1—the structure acts like a secondary coil where the wires are shorted out—the ratio (n-ratio) is equal to the number of turns in the primary. The voltage, frequency, and number of turns in the primary are selected or varied to achieve the desired energy transfer and depth of penetration needed in the reaction device.

The relative magnetic permeability of the material used in reactor and other receiver components determines the inductive reactance of the system. Materials with high relative magnetic permeability (e.g., ferromagnetic materials) will attract and exhibit greater concentrations of magnetic flux, and magnetic energy, than materials of low relative magnetic permeability (e.g., paramagnetic materials). Placing, plating, cladding, or doping the base metal of the receiver with a ferromagnetic or paramagnetic material, or simply placing a ferromagnetic or paramagnetic material within the receiver, can be used to create the desired heating effect where the receiver material otherwise might not couple well with the induction coil, or to allow an increase in distance between the receiver and the inductor. Varying the depth of placement, cladding, plating, or doping, or the location of inserts, may be used to further concentrate the heating effects to specific regions or components of the receiver.

Multiple induction coils, with varying wire sizes and coil geometries may be used simultaneously (connected in parallel or in series) to create the desired heat flux characteristic in the receiver. Higher flux can be achieved by stacking coils to increase the ratio of the number of turns in the primary induction coil to the secondary reactor. Conversely, lower flux concentrations can be achieved by changing the spacing of the wires. The approximately concentric rings that are characteristic of a flat induction coil (primary windings) can be modified into different geometries such as squares, hexagons, octagons, or irregular shapes so long as the concentric rings have an open center to minimize the interference and cancellation of electromagnetic fields caused by adjacent wires with opposite current flow directions. The size of the wire can be varied to increase the number of turns, to increase the power density and to accommodate the induction frequency.

Heat is generated in the receiver when alternating current is passed through the coil (320). The frequency of the alternating current plus the properties of the receiver determine the depth of penetration into the metal structure of the receiver; lower frequencies produce deeper heating. The frequency of the induction coil therefore may be anywhere from a few hertz to many kHz or even megahertz. However, the heating power is proportional to the frequency and the n-ratio. Higher induction frequencies require fewer turns. However, as will be noted below, lower frequencies allow greater penetration of electromotive force (EMF) energy into the receiver (the secondary) and therefore will provide deeper heating and lower surface temperatures. Optimization therefore does not always favor higher frequencies.

The picture on the left in FIG. 2 is the side of a primary coil that faces a unit to be heated. On the right, the backside of the coil (210) is shown, including seven "flux concentrators" (211) which channel the magnetic field so that a substantial portion of (or the majority of) the field energy from the backside of the coil is directed around the coil, toward (or into) the unit to be heated.

Figure 3A:
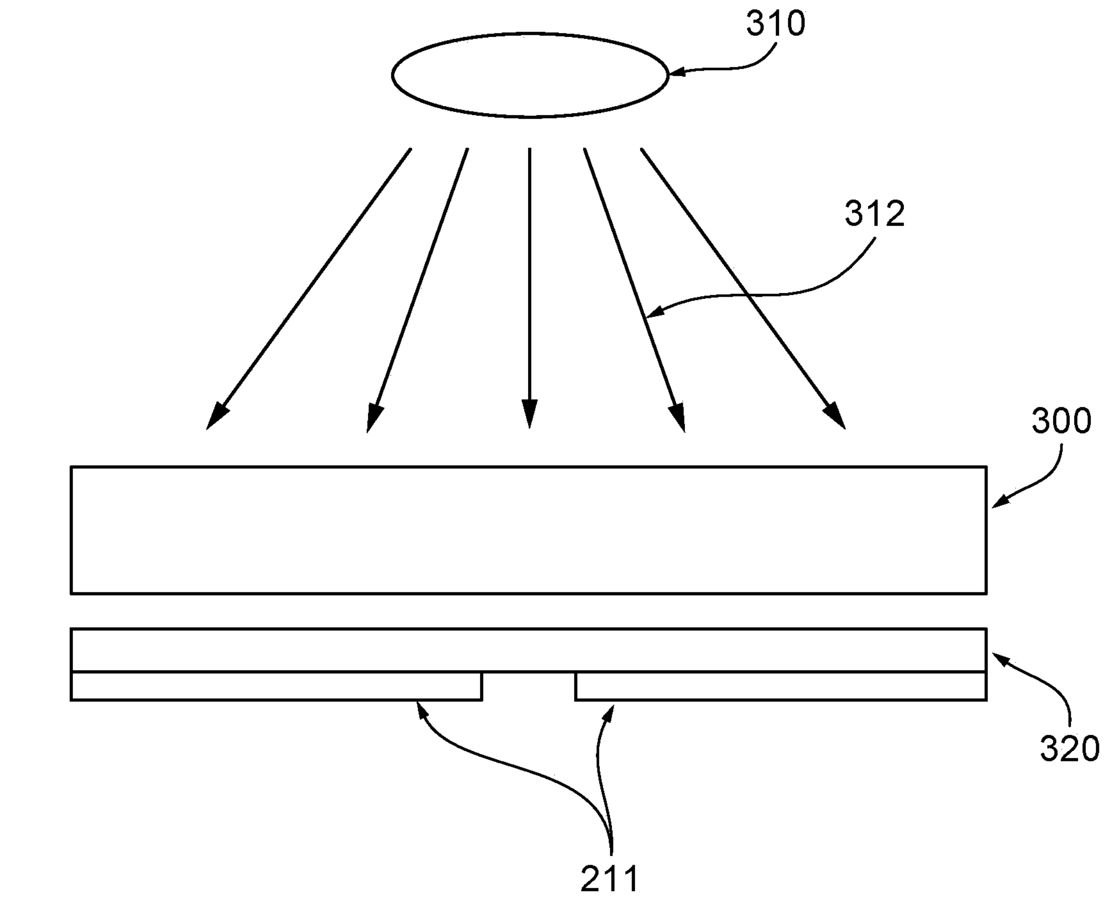
FIG. 3A is a schematic, side, cross-sectional view of a solar thermochemical reactor with supplemental induction heating.

FIG. 3A illustrates a solar thermochemical reactor (300) that has had an induction heater added to one side. In some preferred embodiments, the reactor is 3D-fabricated with the methods of the second patent document, with the catalyst structures (not shown in FIG. 3A) being inserted during the "build" or afterwards. Paramagnetic, or more preferably ferromagnetic shims or other structures (susceptors) may be added to the catalyst channels to facilitate concentration of the electromagnetic fields, or separately placed in the reactor near the chemical reaction channels. Magnetic hysteresis and eddy currents generated in the receiver materials will provide localized heating. In FIG. 3A, radiant energy (312) from a solar concentrator, such as discussed in U.S. Pat. No. 9,950,305, enters into a receiver unit through an aperture (310), entering a cavity where it encounters the reactor (300), which absorbs at least a portion of the radiant energy. The induction heater as depicted here is a pancake coil style heater (320) with flux concentrators (211).

Figure 3B:
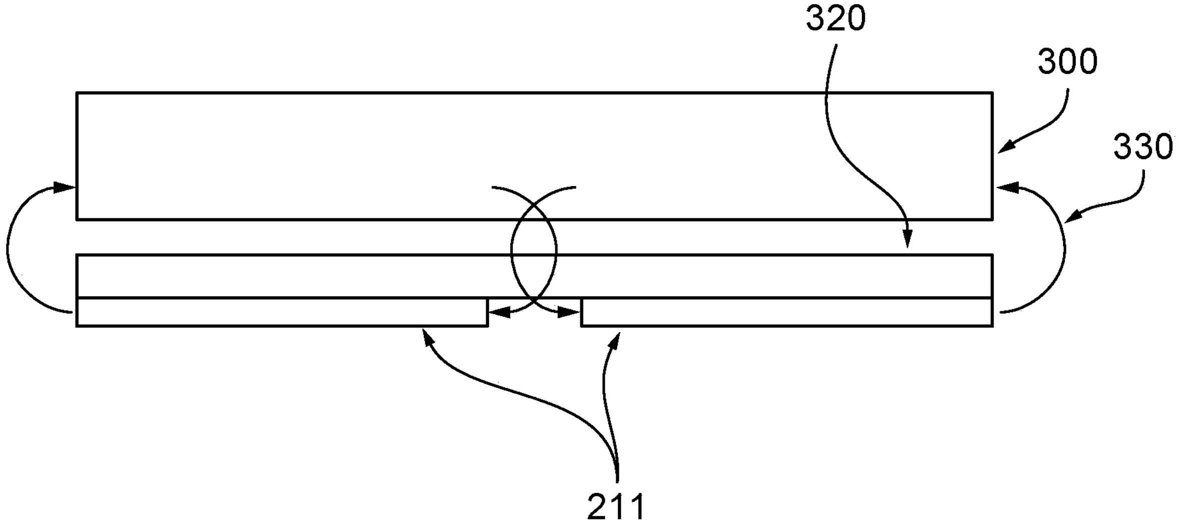
FIG. 3B is a schematic, side, cross-sectional view of a thermochemical processor with induction heating and shows the magnetic field.

FIG. 3B provides a schematic depiction of the magnetic field from the pancake coil (320), which intercepts and passes through the reactor or other receiver (300), therefore generating the aforementioned eddy currents that create heat through joule heating. As depicted in in FIG. 3A, the flux concentrators (211) in FIG. 3B are only associated with the bottom of the pancake coil (320). However, in another embodiment (not shown) the flux concentrators extend from their most radial position (which is parallel to the face of the receiver) to the sides (or adjacent to the sides) of the receiver. In this way, the flux concentrators can be designed to direct the EMF into specific regions of the receiver.

The degree of thermal penetration within the reactor or other receiver (300) is a function of the frequency of the electrical power, and the relative magnetic permeability and the electrical resistivity of the receiver structure. In general, greater thermal penetration is enabled by low frequencies and more shallow thermal penetration is produced with higher frequencies. For high temperature materials like Haynes 230 and 282, which are believed to be, at best, weak paramagnetic materials and are not ferromagnetic, frequencies around 50-60 Hz (the frequency of the commercial electrical grid) will support thermal penetration of several centimeters (cm); at 400 Hz (the frequency of power electronics in common commercial aircraft) thermal penetration is reduced. At frequencies of a few tens of kHz, thermal penetration will be measured in mm.

Materials with very low electrical resistivity (like copper or aluminum) do not heat well through induction. High frequencies in materials like Haynes 230 or 282 may induce heat just a few (or several) millimeters into the surface, supporting efficient heat transfer through the device by conduction or convection to heat a working fluid, a chemical reaction or a separation operation, such as desorption from a solid adsorbent. These limitations are managed by selectively varying frequency and geometry of the induction coils, by using flux concentrators, by plating, cladding and doping reactor components and through receiver designs that will place the induced heat where it can be most efficiently utilized, such as in the top wall of a process layer.

Figure 4:
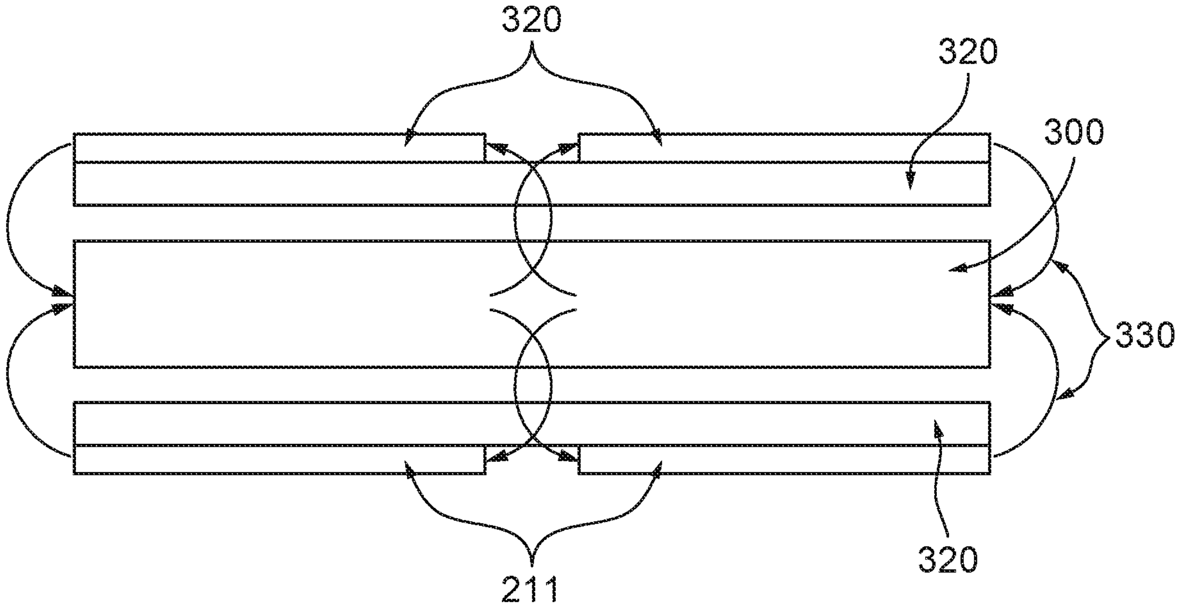
FIG. 4 is a schematic, side, cross-sectional view of a thermochemical processor with pancake inductors on both major sides and shows the magnetic field.

FIG. 4 illustrates a reactor (300) where pancake induction coils (320) have been placed on both faces of the reactor. Arrows 330 roughly show the interaction of the magnetic field between the reactor (300) and the flux concentrators (211). Not shown is the more direct magnetic flux between the reactor and the induction coils. An advantage to heating from both sides of the reactor is the potential for more uniform heating of the reactor. Another is that it may allow more overall heating power or more productive utilization of the reactor volume. Pancake coil induction heaters are commonly used for cooktop stoves; power levels for these devices typically range from the 1 kilowatt (kW) heating range to 10 kW or more. This is particularly relevant as the solar thermochemical reactor of the first two patent documents was demonstrated with solar heating rates of up to about 10-12 kW of heat. Pancake coils may also be stacked (tiled) (not shown in the illustration) to increase the energy density of the induction system when there is limited surface area or the surface is an irregular shape.

Figure 5:
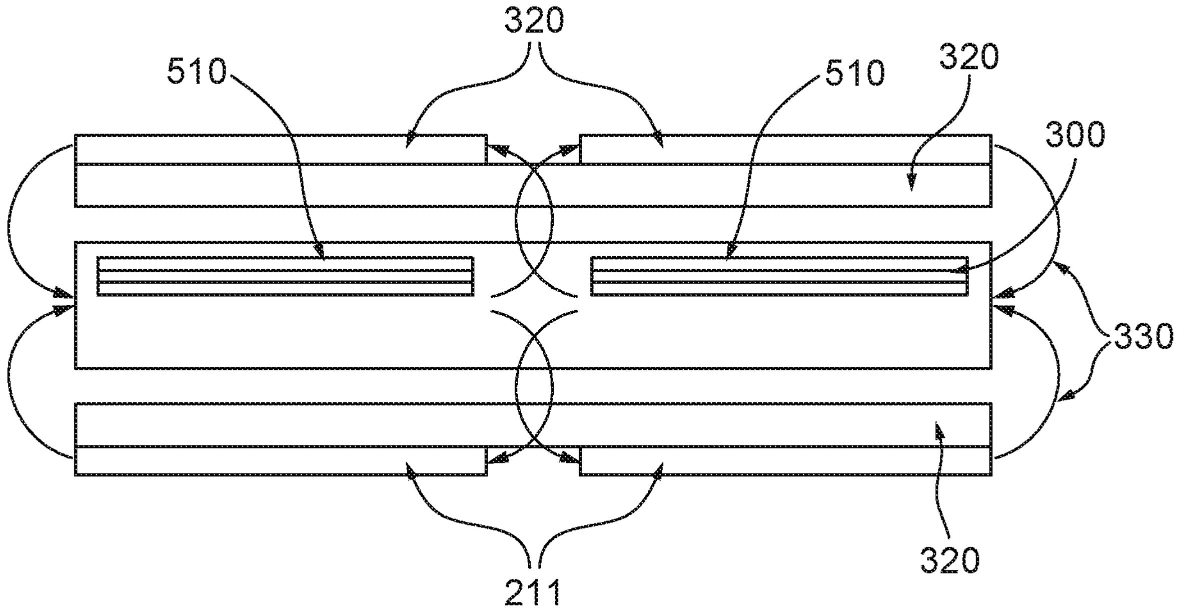
FIG. 5 is a schematic, side, cross-sectional view of a thermochemical processor with pancake inductors on both major sides and shows the magnetic field. The process channel includes inserts that may be catalyst inserts, flux concentrators, or both inserts and flux concentrators.

FIG. 5 illustrates a configuration in which reaction channels contain catalysts with flux concentrators (510) placed within or in close proximity to the reaction channels. The concentrator is a ferromagnetic or paramagnetic substance that draws the magnetic field within it, therefore providing preferential heating into the catalyst channels or immediately adjacent to them.

Flux concentrators may be installed during the 3D printing operation, within channels after 3D printing has occurred, or during other fabrication steps. The flux concentrators may be an integral portion of the structure (for example, if they are built in during a 3D print operation) or non-structural (for example, as a material that is inserted within the fecralloy foam in which catalyst material is also inserted). One characteristic of a fecralloy material in which the catalyst is deposited is that it is ferromagnetic but has a Curie Temperature of around 600° C. Therefore, it loses its ferromagnetic properties (and becomes paramagnetic) as it approaches and surpasses that temperature. For reactions and other unit operations requiring higher temperatures, a different material than FeCralloy may be utilized in order to have embedded flux concentrators; however, the FeCralloy can still provide support to preheating the structure during startup. Alloys such as cobalt-iron (CoFe) or aluminum, nickel and cobalt (AlNiCo)—have higher Curie temperatures, ranging from about 800° C. to over 900° C., with ferromagnetic properties starting to decline at slightly colder temperatures. As those skilled in the art know, steam-methane reforming proceeds quickly at these temperatures with conventional catalysts, including rhodium. As a result, CoFe and AlNiCo are suitable materials for induction heating of high temperature reaction channels. Other materials, like FeCrAlloy or iron or nickel may be suitable for unit operations requiring more modest temperatures, such as for steam generation, desorption, distillation, or other reactions, or simply heating.

Of additional interest is the opportunity to select the flux concentrator material for its temperature-sensitive magnetic properties, so that more heat is added to colder channels, or into sections of colder channels, than to hotter process channels and/or sections. Higher temperatures translate to faster chemical (kinetic) reaction rates but excessively high temperatures may damage the materials of the receiver, catalysts, adsorbents, etc. Also, by selectively concentrating inductive heating to colder sections of a receiver, reactions, separations or other endothermic operations can be sped up and the higher overall productivity of the micro- and/or meso-channels can be achieved.

Figure 5A:
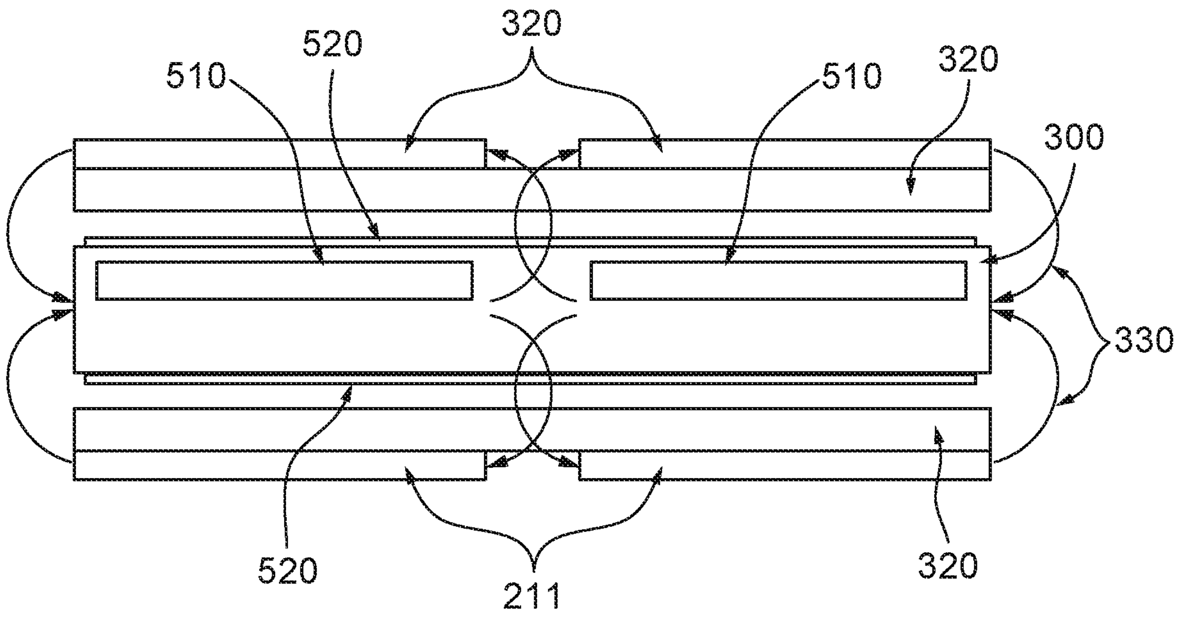
FIG. 5A is a schematic, side, cross-sectional view of a thermochemical processor with pancake inductors on both major sides and shows the magnetic field. The process channel includes catalyst inserts, and induction enhancers are disposed on the walls of the process channel.

In FIG. 5A, flux concentrators (520) operate as induction enhancers and are placed in close proximity to, on, against or just inside the outer walls of the reactor or other receiver. As induction enhancers, they attract and intensify the magnetic field from the inductor to the reactor body and, because they can generate substantial heat, are preferably placed in good thermal contact with the reactor body. Good electrical conduct can also aid in that it allows eddy currents, formed in the flux concentrators, to pass into the receiver. A thermal paste material may be used for affixing the induction enhancer/flux concentrator material to the receiver or alternately it may be affixed through other methods, such as laser-welding or brazing. The flux concentrators may be single units per receiver side or multiple units, for example concentric rings or radial strips ("radials") of flux concentrator material may be placed on, against or just inside the outer walls. In the case of FIG. 5A, heat is generated by induction in the flux concentrators 211 and/or the flux concentrators 520 within the reactor walls, with conduction to the catalyst-insert-containing channels 510. Cobalt-iron (CoFe) alloys with high Curie Temperatures, up to around 950° C. in some cases, and with magnetic saturation levels peaking about 850° C., have been shown to provide high magnetic permeabilities with suitable heat generation rates and, used as induction enhancers in experiments, have enabled the target (e.g., the reactor) to be placed as much as 2 centimeters from the induction coils. Distances of 1 to 2 centimeters are particularly useful because they allow suitable insulating material to be placed between the receiver and the coil, limiting the conduction of heat from the receiver to the coil and also making it easier to cool the coil, for example using air cooling, water cooling or passive methods of cooling.

Figure 6A:
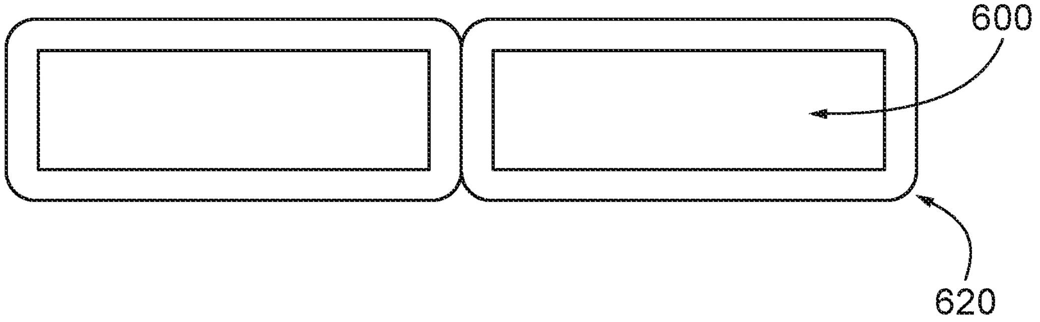
FIG. 6A is a schematic, side, cross-sectional view of a toroidal, thermochemical processor with conductive coils wrapped around the toroidal walls. Insulation between the processor and the conductive coils is not shown but may be present.
Figure 6B:
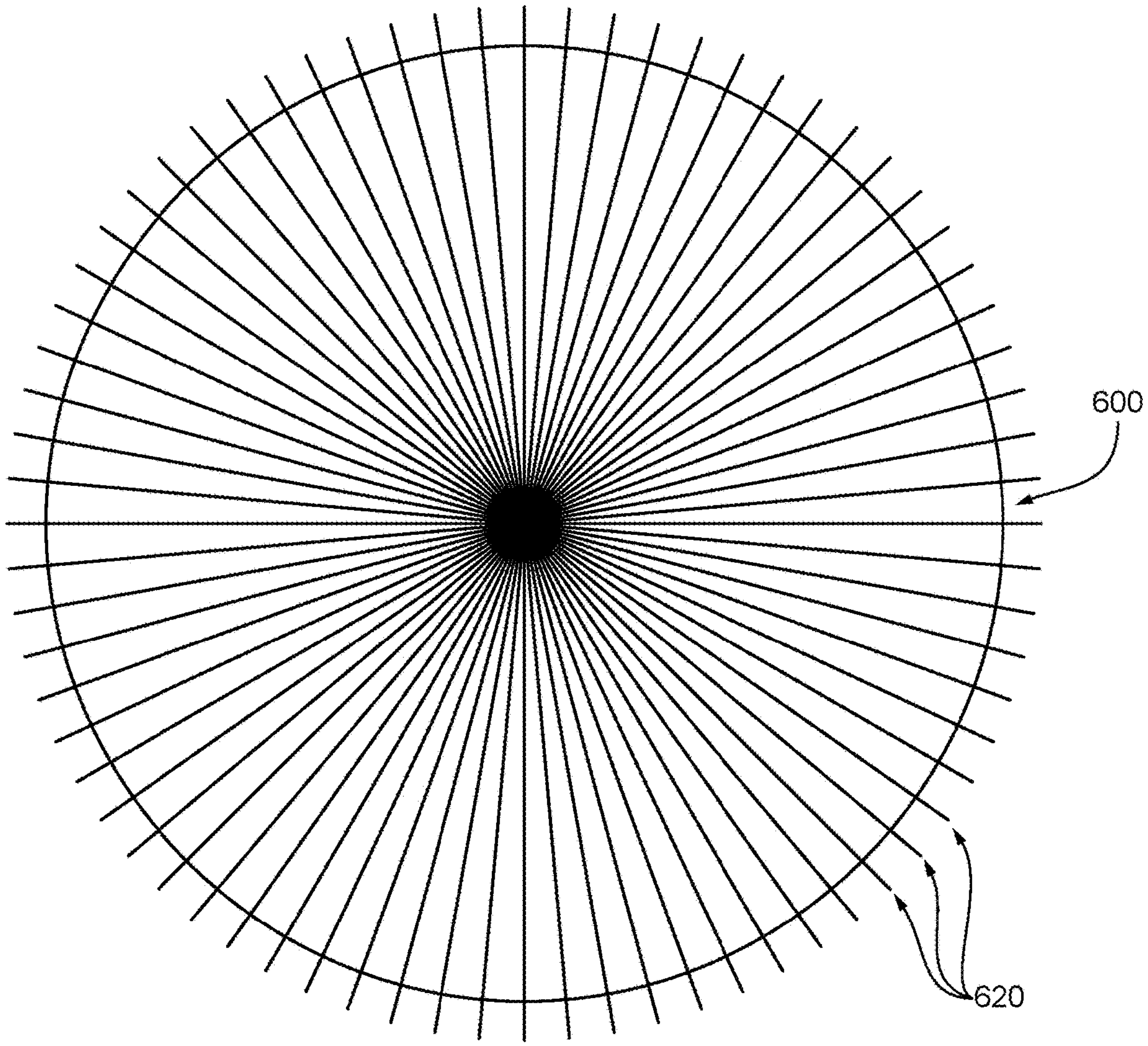
FIG. 6B is a schematic, top or bottom view of a toroidal, thermochemical processor with conductive coils wrapped around the toroidal walls.

FIGS. 6A and 6B present a second, alternative embodiment for inductively heating a micro- and/or meso-channel reactor, heat exchanger or separator. FIG. 6A shows a cross section through the center of a toroidal disk receiver (600) with a notable difference: a hole has been placed in or near the center, allowing multiple turns of a wire coil around and through the unit. The induction coils (620) wrap around the receiver body, or more preferably around one or more layers of thermal insulation surrounding the receiver body, forcing the EMF into the receiver and providing more effective use of the EMF to generate eddy currents that will tend to travel in approximately circular arcs around the hole in the receiver, creating heat through magnetic hysteresis losses and/or joule heating.

FIG. 6B shows a top (or bottom) view, with induction coils (620) wrapped around the receiver (600), with thermal insulation present but not shown between the coils and the receiver. While this view shows just 72 apparent turns, the number of turns is based upon the energy transfer needs and is not a limiting number. The number of turns was selected for visualization purposes. Many more apparent turns—hundreds or thousands—are possible.

Although they are not shown, flux concentrators may also be placed within the toroidal receiver in order to preferentially generate heat in the proximity of a catalyst, an adsorbent, or in other locations where preferential heating is desired, or to shield regions of the receiver where heating is not desired.

Figure 6C:
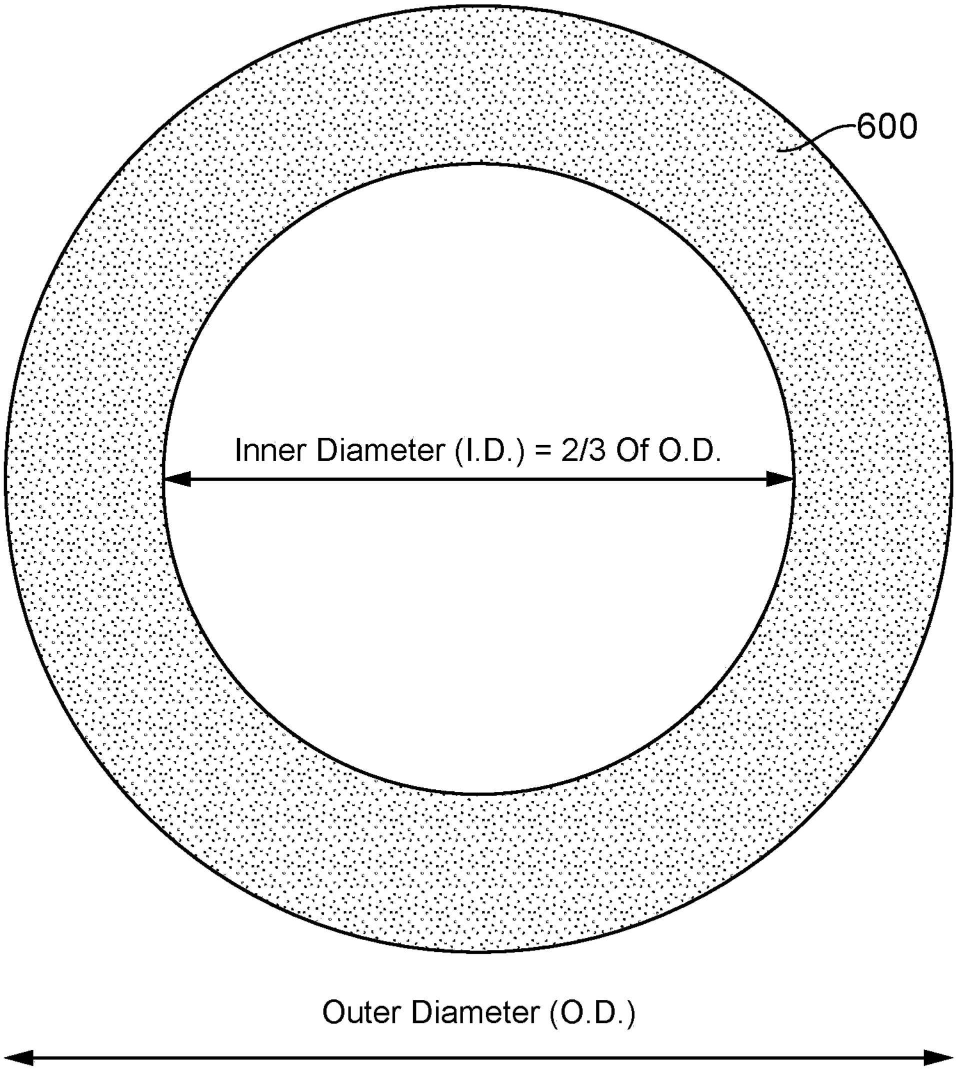
FIGS. 6C, 6D, and 6E show alternative designs of a toroidal, thermochemical processor with a larger central hole.
Figure 6D:
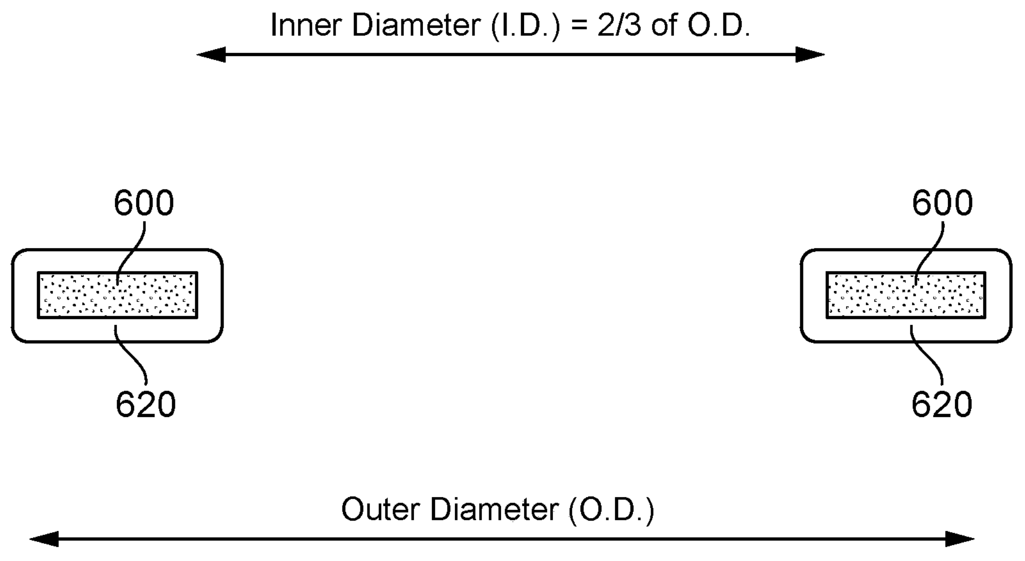
Figure 6E:
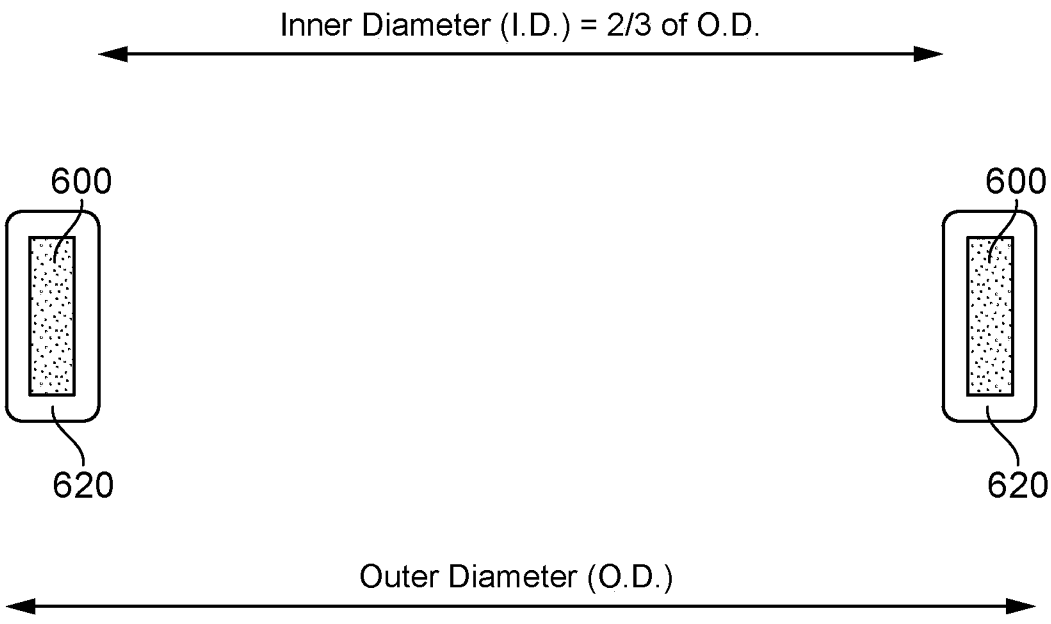

While FIGS. 6A and 6B present images where the diameter of the hole in the center is relatively small compared to the overall (outer) diameter of the receiver, the opposite may also be considered. For example, as depicted in FIGS. 6C and 6D, the outer diameter may be several tens of centimeters, or even greater than a meter, while the inner hole might be greater than 50% of the outer diameter, or even greater than 90%, for example in a case of FIG. 6E where a cross-section of the receiver has the appearance of a short section of cylindrical pipe. Here, the unit may not be planar; that is, channels may be primarily organized in a direction that is not parallel with the receiver diameter.

The toroidal approach can be used to heat an endothermic reactor such as has already been described in this text. Alternately, by segmenting the coils and independently controlling each segment, heat can be specifically varied from segment to segment. This may be particularly useful in operating a thermal-swing or thermally-enhanced pressure-swing adsorption system, with individual collections of channels operating cooperatively as "cells", but with the cells purposely operated in or out of phase of each other. An example of out-of-phase operation can be beneficial, such as in the units described in U.S. Pat. No. 6,974,496, which includes multi-celled micro- and meso-channel adsorption units with internal thermal recuperation. Thermal swing of this sort can also be useful for some chemical processes, such as thermochemical water-splitting.

As another example, the use of a ferromagnetic foam (e.g., FeCralloy) within a channel can support placing a limited amount of heat within a fluid where vaporization is desired. Yet additional embodiments are possible. For example, induction coils can be arranged in non-circular geometries, such as in the form of triangles, squares, hexagons, octagons, etc. Coils can be "tiled" together in planar or non-planar structures; however, the designer should consider constructive and destructive interference when tiling units together.

Insulating materials can be added to a) limit heat leaks and b) to thermally separate the reactor from the induction coils. Ideally, the coils are located in close proximity to the unit to be heated, but with an insulating layer (for example, millimeters to centimeters in thickness, i.e., 1-30 mm or 1-20 mm or 1-10 mm) separating the coils from the micro- and/or meso-channel device. Copper such as in Litz wire or aluminum are the preferential materials for induction coils. However, they do not perform as well at elevated temperature and thus, must be isolated from high temperature reactors or cooled (actively or passively) in order to achieve the highest performance.

Basic Hybrid Micro/Meso-Channel Structure for Induction Heating with an Additional Heating Channel In previous work, we invented a micro/meso-channel chemical processor unit, for endothermic operations—more specifically, a catalytic pancake reactor—the efficiency of which benefits from heating the reaction channels from two sides. As described in U.S. Pat. No. 9,950,305, the pancake reactor is a counter-radial flow reactor with outflowing reaction channels, with catalysts, with the reaction products then flowing inwardly in adjacent channels, providing sensible heat from the products to the catalytic reaction channels. In this manner, this heat is in addition to the solar thermal energy being provided from the opposite side.

Internal counterflow is a particularly efficient way to recuperate energy from the product stream and is exergetically more efficient than simply using the product stream to further preheat the reaction system through, say, the use of an external counterflow microchannel heat exchanger. In essence, the sensible energy in the product stream is recuperated into its reaction channel steam.

Figure 10:
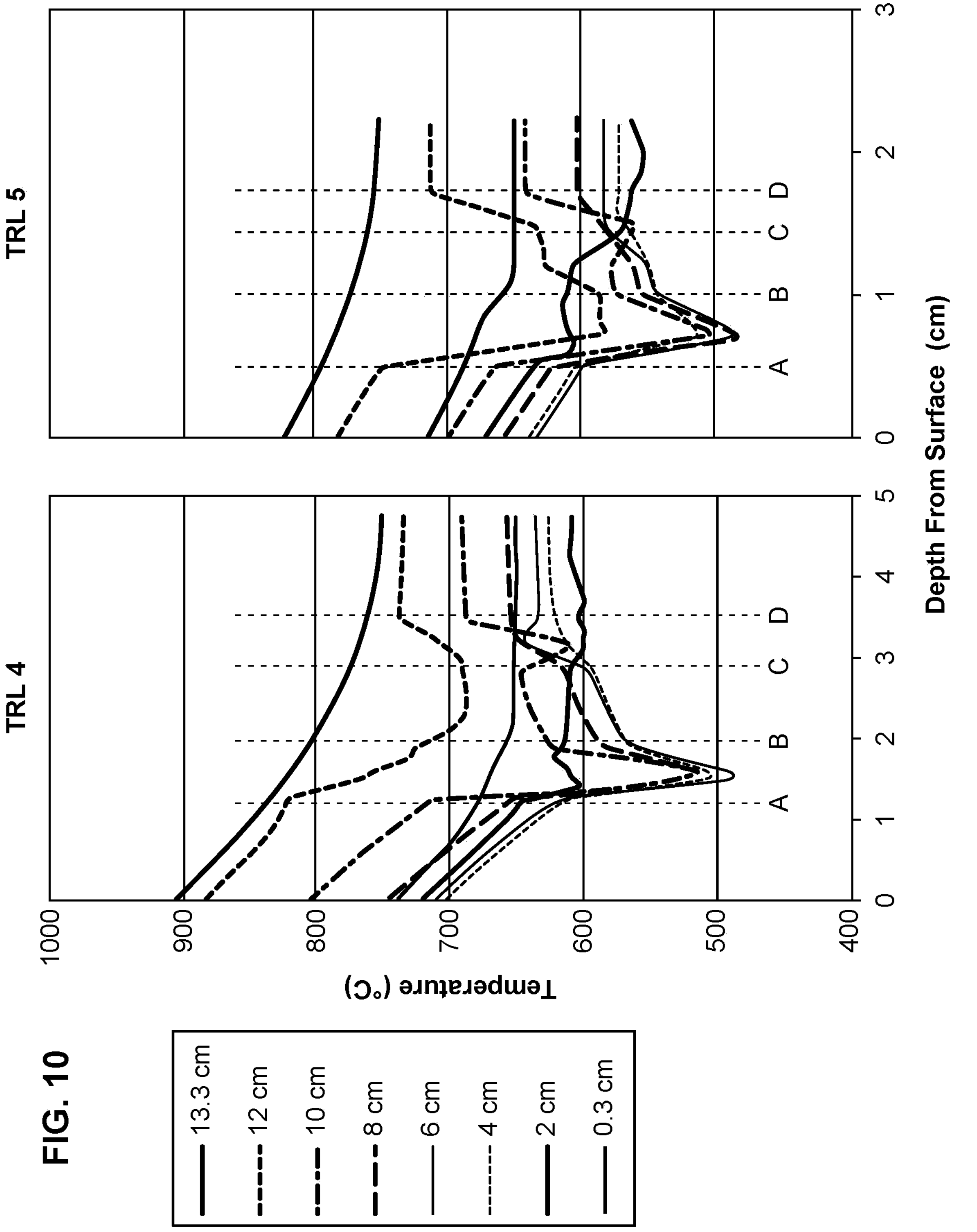
FIG. 10 shows calculated thermal profiles into the bodies of two solar-heated methane steam reformers. From left-to-right, heat on the outer surface, the process (reaction) channel, and the heat recuperation channel.

The advantage of this approach is illustrated in the graphs shown in FIG. 10, which show simulated temperature profiles in two reactor designs. The greater slopes of the internal temperature profiles show that, of the heat rates into the catalytic channel, from the surface and from the return channel, the solar-heated surface provides greater heat. In this case, around 8-10 kW. However, the return channel provides substantial heating, typically 1-2 kW overall. The graphed lines show temperatures from distances ranging from the center of the reactor (0.0 cm) to the outer rim (13.3 cm). Depth from surface is the distance into the reactor from the surface receiving concentrated solar energy. The A-B band represents the depth and location of a catalytic microchannel and the C-D band represents the depth and location of a return channel. Thermal profiles show that heat is provided to the catalytic microchannel from both the surface and from the adjacent return channel.

Alternative embodiments could have used a separate source of heat in the return channels, for example heat from a combusting fluid. The return channels can be reconfigured so that they recuperate to other reaction channels. An important benefit is the imperfections in the parabolic dish and/or the reactor design are mitigated in a way that reduces "hot spots" in the reactor. For example, imperfections in the parabolic shape of the dish can create both hot and cold spots on the chemical processor surface. Alternately, imperfections in flow, brought out by minor variations in the design of the processing unit which can be amplified: Process channels with slightly reduced flow will tend to get hotter, in the case of an endothermic chemical reaction generating greater reaction and, in cases like steam reforming, corresponding increases in volumetric flow that promote further reductions in mass flow into the hotter channels; and channels that receive greater flow will tend to run colder, producing a lower percentage of reaction with increases in volumetric flow. This is an undesirable positive feedback loop that tends to further increase the temperature of hotter channels, amplifying hot spots, and further decrease the temperature of colder channels.

Hot spots are problematic, even when nickel superalloys are used for the reactor structure, since the strength of these alloys falls rapidly at very high temperatures (e.g., in the 800-1000° C. range) as temperatures are increased. Thus, having the "hottest" reaction channels recuperate into relatively colder channels, and vice versa, provides effective thermal spreading and creates a negative feedback loop, mitigating the positive feedback loop, that enables improved system performance and greater strength in the alloy structure. The opportunity for this is evident from simulations which predicted up to 100° C. reduction in the temperatures of the hottest spots when a counter-crossflow configuration is applied.

Thermal Penetration of Induction Heating for Two- and Three-Layer Micro/Meso-Channel Chemical Process Units For induction heating, we sought to maintain the advantage of the negative feedback loop in the previous invention-brought about by the internal counter-cross flow structure, but found that additional improvements were needed in order to adapt our basic reactor concept to efficient inductive heating.

We also found that nickel superalloys, which tend to be (or are understood to be) weakly paramagnetic present both advantages and disadvantages for induction heating. For example, induction heating in paramagnetic materials is known to be through joule-heating (through induced eddy currents) and does not include a hysteresis heating component. This means there is a reduced capacity for heating but it also means there is an improved capability for reducing hot spots on the reactor surface.

When heating is dominated by eddy-current heating, it is useful to recognize and exploit the variation in heating that occurs as a function of depth into the processing unit structure. Many induction-heating references define a term, "thermal penetration" (δ), to be the distance into an externally-heated material where 86% of the heating occurs; the other 14% occurs deeper into the device. A common mathematical representation of this is:

$$\delta = 5000\, SQRT[\sigma/\mu f]$$

Where σ is the electrical resistivity of the material in ohm-centimeters (Ω-cm), μ is the relative magnetic permeability of the material (which is unitless, with the vacuum of space having the value μ=1), and f is the frequency in Hertz (Hz) of the magnetic field. In this case, the units of δ are centimeters (cm).

For near-term applications, the frequency of the induction coil is expected to typically be in the range of 1-100 kHz, more preferably between 1-50 kHz, as a number of induction heating units have already been designed for applications in this frequency range. These units, including power electronics that convert standard AC power to the desired frequency for induction, are in mass production and have been demonstrated to operate at high efficiencies.

Here we consider the case of heating a micro/meso-channel device that is constructed of the nickel superalloy Haynes 282, an alloy that was developed for high temperature application such as gas turbines and which exhibits favorable characteristics which increase the lifetime of high temperature chemical process units compared to many other alloys. Development work has also progressed that demonstrates the suitability of Haynes 282 for the additive manufacturing of micro/meso-channel components. For example, see U.S. Pat. No. 10,981,141 B2 which describes the design and method of making an additively manufactured, pancake reactor.

The electrical resistivity of Haynes 282 does not substantially increase with temperature. As a result, the thermal penetration distance for Haynes 282 alloys varies more strongly with frequency, and as a result we can calculate that the thermal penetration (δ) of Haynes 282 at a representative frequency of, say, 25 kHz, is about 3.61 millimeters (mm);

or about 2.85-5.71 mm if we assume an operating range of 10-40 kHz for the induction system. This gives us a first look at the approximate depth, into our chemical processor, within which the majority of induction heating will occur.

Alternately, it can be useful to consider induction heating in terms of the half-energy distance ($d_{1/2}$) into the reactor at which half of the received magnetic energy (E) is converted to heat. This term is mathematically similar to radioactive decay, where physicists discuss the time that it takes half of a radioisotope sample to decay into another species. At two half-energy distances ($2\ d_{1/2}$), ¾ths of the energy has been converted into heat; at three half-energy distances ($3\ d_{1/2}$), ⅞ths; at $4\ d_{1/2}$, 15/16ths, etc.
The relationship for energy conversion into heat within the micro/meso-channel receiver is therefore:

$$E/Eo = e^{-\lambda t}$$

Where Eo is the magnetic energy entering the chemical processor, E represents the magnetic energy that has not been converted into heat throughout the material, $\lambda$ is a "decay constant" based on the properties of the material and in fact is equal to $2/\delta$, and t as a variable represents the thickness into the material at which the value for E is desired. The half-energy distance is therefore:

$$d_{1/2} = \ln(2)/\lambda$$

which, for Haynes 282 at 25 kHz is about 1.25 mm.

In FIG. 10, we compare the thermal profile for two cases, one where heat is added to the outside of the micro/meso-channel chemical processor (for example, through the use of a parabolic dish concentrator to reflect solar energy onto the surface of the a catalytic mesochannel reactor) and the other where an alternating magnetic field at 25 kHz is used to heat within the cover of the same chemical processor.
In this case, the thickness of the cover is 5 mm; that is, the top wall of the catalytic mesochannel is located 5 mm into the reactor. Since each half-energy distance is 1.25 mm, the thickness of the cover is four half-energy distances, and the fractions of incoming magnetic energy that have been converted to heat in the cover is 15/16 and the fraction of magnetic energy that enters the process channel has fallen to 1/16. This is desirable because we also want to use the sensible energy in the reaction product stream to provide additional (recuperative) heating to the process channels from the return (heat transfer) channels.

Figure 11:
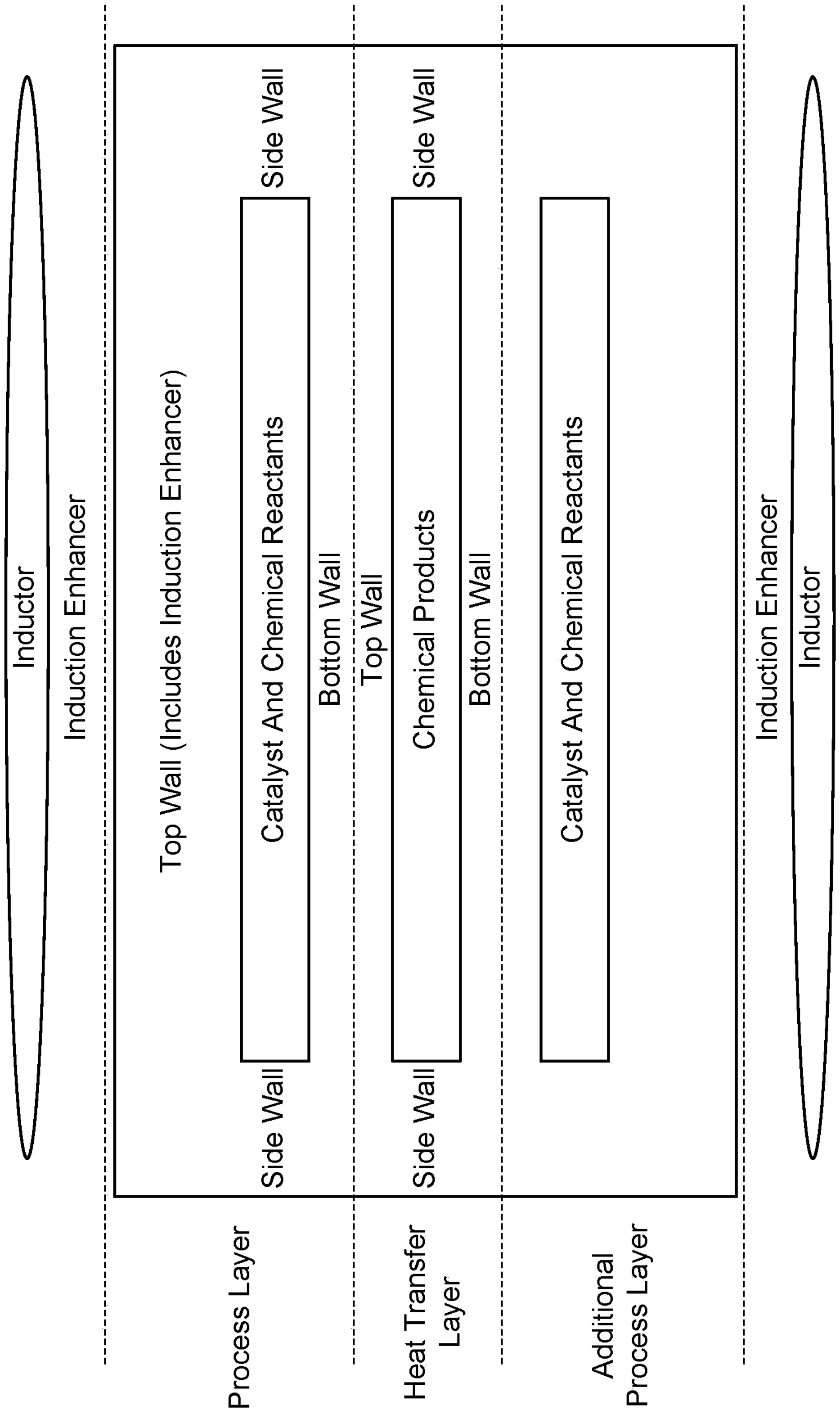
FIG. 11 is a schematic, side, cross-sectional view of a thermochemical processor with pancake inductors on both major sides.

FIG. 11 shows a representative design for the inductively-heated, steam-methane reforming case with internal recuperation from the product gases. This shows a cross-section of a portion of the three-layer, catalytic pancake reactor, with counter-cross flow recuperative heat exchange, highlighting two reaction (process) channels and one return (heat transfer) channel.

Flow is counter-cross flow, but it is convenient to consider the example as if flow is generally moving perpendicular to the page. The temperature gradient, which shows the lowest temperatures in the catalyst (process) channel, confirms that the steam-methane reforming reaction is a substantial "heat sink", which further encourages heating of the catalyst channel from the return fluid in the heat transfer channel.

The cross-section was chosen for a location in the reactor where the return channel and reaction channels are atop one another. The inductors, each pancake coils, generate heat through eddy currents (as Joule-Heating), and may also generate heat through hysteresis heating in the immediate surface metal (on the upper side, this is indicated as the "top wall" and may include an Induction Enhancer).

A gap between the top wall and the inductor allows the placement of insulation and limits heat transfer to the coil, which may require passive or active cooling. In applications where an induction enhancer is desirable, one option is the placement of a thin layer of cobalt-iron (CoFe), which has an extremely high relative magnetic permeability, is considered a "soft" ferromagnetic material (meaning that it has low hysteresis heating), and a high Curie Temperature (~970° C.). Here, the induction enhancer generates heat through both Joule Heating and Hysteresis Heating. Placing the induction enhancer in thermal and electrical contact with the receiver enables heat transfer between the two, which also helps to control the temperature of the CoFe, and encourages eddy currents to pass into the receiver, allowing greater joule heating to take place in the receiver.

FIG. 11 illustrates a cross-section of the three-layer, catalytic, pancake reactor. As previously noted, induction enhancers may be added to the basic reactor concept to increase the degree of "coupling" between the inductors and the treceiver. This facilitates greater energy transfer at distances that allow centimeter-gaps for insulation between the induction coils and the reactor, reducing the need for passively or actively cooling the coils and enabling operation at higher power levels and greater electrical-to-chemical efficiency.

FIG. 12 illustrates thermal profile graphics for two- and three-layer, pancake reactors. The illustrations are turned sideways compared to the previous graphic, to facilitate discussion of the temperature gradients within the inductively heated reactor of our design. This illustration assumes no use of induction enhancers and compares the induction-heated case to one where heat is introduced by another means (e.g., solar concentrators) to the surfaces of the reactor.

Figure 12A:
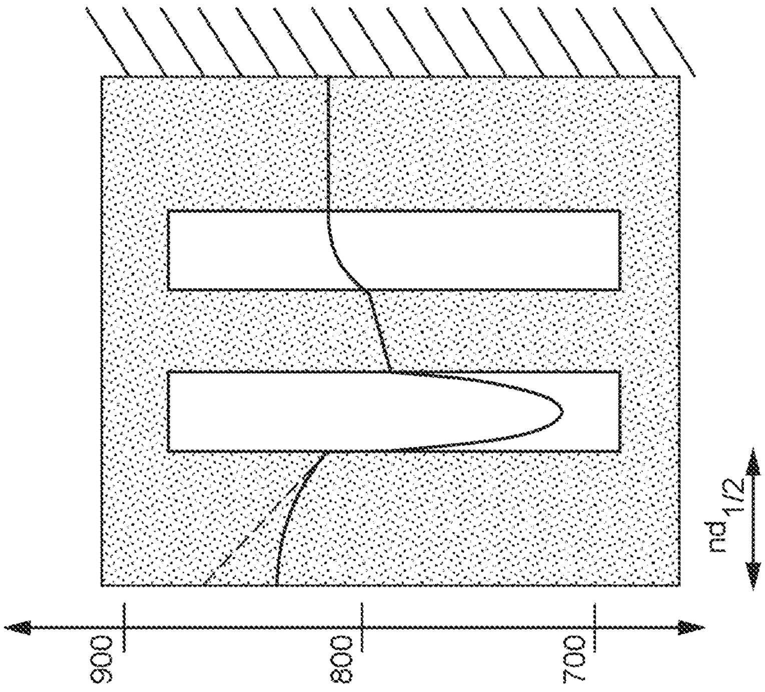
FIG. 12A shows approximate thermal profiles into the bodies of induction-heated methane steam reformers. From left-to-right, heat on the outer surface, the process layer or channel, and the heat transfer layer or heat recuperation channel.

FIG. 12A shows approximate temperature profiles, based on computer simulations and calculations, representing the temperature profiles for a two-layer, pancake reactor performing steam-methane reforming in the left channel with the 2-layer, pancake reactor performing steam-methane reforming in the left channel and with the chemical products of the reaction flowing counter-cross flow to the reaction channel in the channel to the right. The cross-section is near the exit temperature of the reaction channel and was selected at a point where the two channels are immediately adjacent to each other. The right side of this image depicts insulation. The inductor, not shown, is to the left of the unit.

Figure 12B:
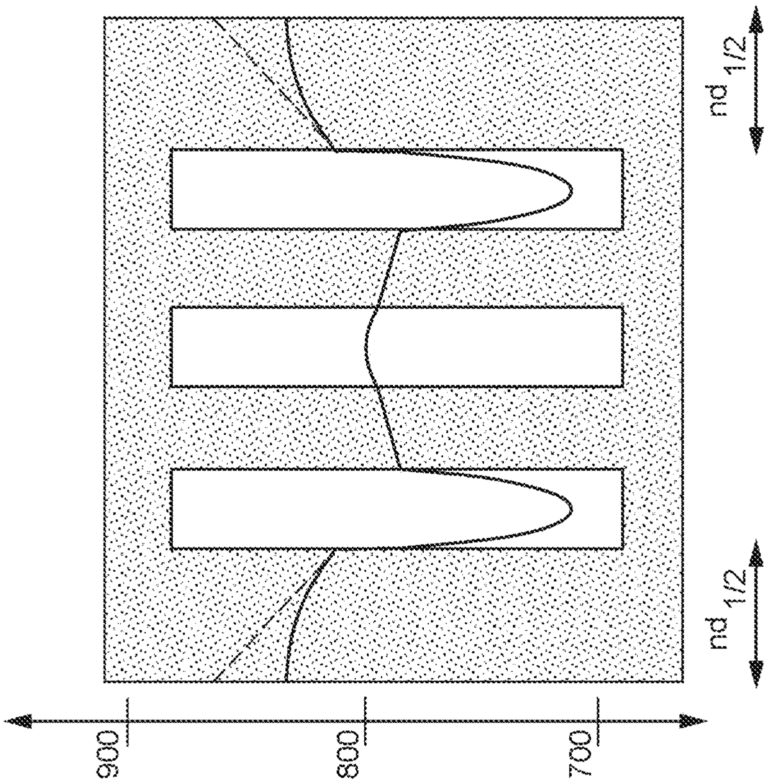
FIG. 12B shows calculated thermal profiles into the body of an induction heated methane steam reformer with pancake coil inductors on both major surfaces (see FIG. 11). From left-to-right, heat on the outer surface, into the reforming channel, the heat recuperation channel, a second reforming channel, and heat into the outer surface.

FIG. 12B shows a temperature profile, based on computer simulations and calculations, representing the temperature profiles for a three-layer, pancake reactor. The two outermost channels are reaction channels within which steam reforming is performed and the innermost channel contains the products of the reaction, providing counter-cross thermal recuperation to the reaction channels. The cross-section was selected to be near the exit point of the reaction channels and is at a point where the three channels are immediately adjacent to each other. Inductors, not shown, are to the left and right of the unit. In both illustrations, temperatures are represented in degree C. The dashed line presents the temperature profile for the outermost walls for cases where heat is added directly to the surface. The solid line, in contrast, recognizes that for induction heating, heat is generated within the wall, not just at the surface. In each case, we represent the thickness of the inductively-heated walls as being a number (n) of half-energy distances ($d_{1/2}$). For cases where $d_{1/2}=4$, 15/16ths of the heat that is generated by magnetic energy is converted into heat within the wall. The remainder of the opportunity for heat generation, or 1/16ths, may be generated within the catalytic reaction channel. The efficiency gain from exergetically-favorable recuperation is assured by proper design of the induction system, including the selection of frequency and the design of the reaction structure, so that virtually no induction heating occurs past the reaction channel (or in the space between the two reaction channels for the rightmost illustration). This is the best case for encouraging heat flow from sensible energy in the return (heat transfer) channels to the reaction (process) channels, therefore providing additional support for the endothermic, catalytic steam-reforming reaction.

Chemical Transformers

Chemical Transformers are process-intensive chemical process systems which gain an economic and productivity advantage through the incorporation of micro- and meso-channel reactors, separators, heat exchangers, vaporizers and condensers. The compact size of these mass-producible units, plus their high process intensities, enables their use in relatively small system in a manner that is analogous to electrical transformers.

In one embodiment, the chemical transformer performs steam reforming and water-gas shift reactions, using electrical energy to provide heat for endothermic operations such as steam reforming of a hydrocarbon (e.g., methane), steam generation, preheating fluids, and of course providing the energy for classical mechanical or electrical operations such as driving pumps, compressors, valves, controls, etc. Electro-chemical operations may also be supported. Hydrogen and other chemicals can be produced in a chemical transformer using methane reforming, water-gas shift, heat exchange and other unit operations. Placing a small chemical transformer, such as the unit shown on the following slide, which has a footprint of about 2 square meters, provides an opportunity to generate around 150-200 kg of $H_2$ per day, or larger or smaller amounts.

Figure 7:
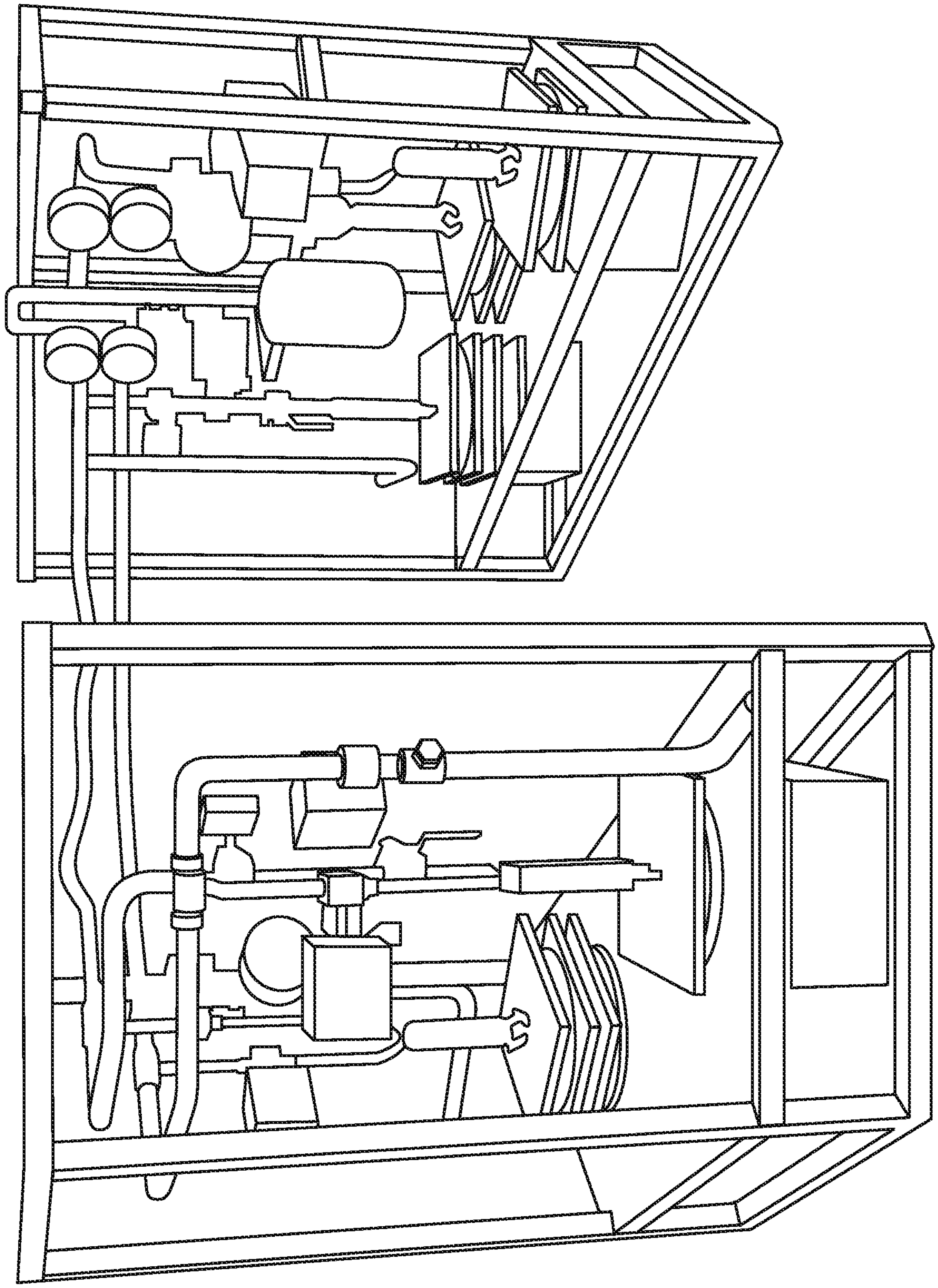
FIG. 7 is a schematic illustration of a chemical transformer comprising a plurality of components in a hexagonal housing that is shown opened into half-hexagons (half-hexes).

FIG. 7 illustrates a Hex-Shaped Chemical Transformer that can be pulled apart into two half-hex subsystems, for assembly, shipping and maintenance. In this depiction there are five, pancake-shaped microchannel steam methane reformers, each with an inductive heating coil on each side, and one water-gas shift reactor that processes the products from each reformer. Also included are various microchannel heat exchangers plus control values and sensors (e.g., thermocouples and pressure transducers). Power generators that convert AC power from the electrical grid to higher frequency electricity for the induction coils are located as compact boxes in the bottom-most section of the system. In this design, there are no pumps or compressors, but these mechanical units can be included in chemical transformers.

The illustrated five, pancake-shaped microchannel reformers (FIG. 7), are preferably based on counter-cross flow channels within the reactors, plus additional heat exchangers, with inductive heating as the source of heat for the endothermic steam-methane reforming operation, which preferably is conducted at temperatures above 700° C.; more preferably above 800° C. Currently, the preferred, low-cost method of hydrogen production through most of the world is based on steam-methane reforming, with a portion of the energy required for this endothermic operation ultimately coming from the incoming methane feed, such as by combusting a "tail gas" that is produced by operating a pressure-swing adsorption system downstream of a steam methane reformer and a water-gas shift reactor.

The use of solar or other energy to drive the endothermic operations reduces the necessity of using methane for the required heat. This potentially reduces the fossil carbon emissions associated with the overall system by up to about 40% and, to the extent that the replacement energy comes from renewable sources, such as solar thermal heat or electricity from wind generators or solar photovoltaics, assures that at least a portion of the energy in the chemical products is at least somewhat renewable energy. Further, when a non-fossil methane source is the feedstock, the fossil carbon emissions of the system can be zero.

Hexagons were selected as an efficient way to configure the internals, including plumbing, controls (e.g., valves), and sensors such as pressure transducers, thermocouples and chemical sensors. The use of hexagons, which may be "regular" or "irregular" in geometry, that can be separated into two "half-hex" sections, such as shown in FIG. 7, further enhances the assembly of components within the hex-structure and allows the hex system to be opened for easier access to components for maintenance and replacement purposes.

Methods other than induction heaters can be used for electrical heating of endothermic operations, including electrical resistance heaters, such as cartridge heaters, and radiant heaters.

Figure 8:
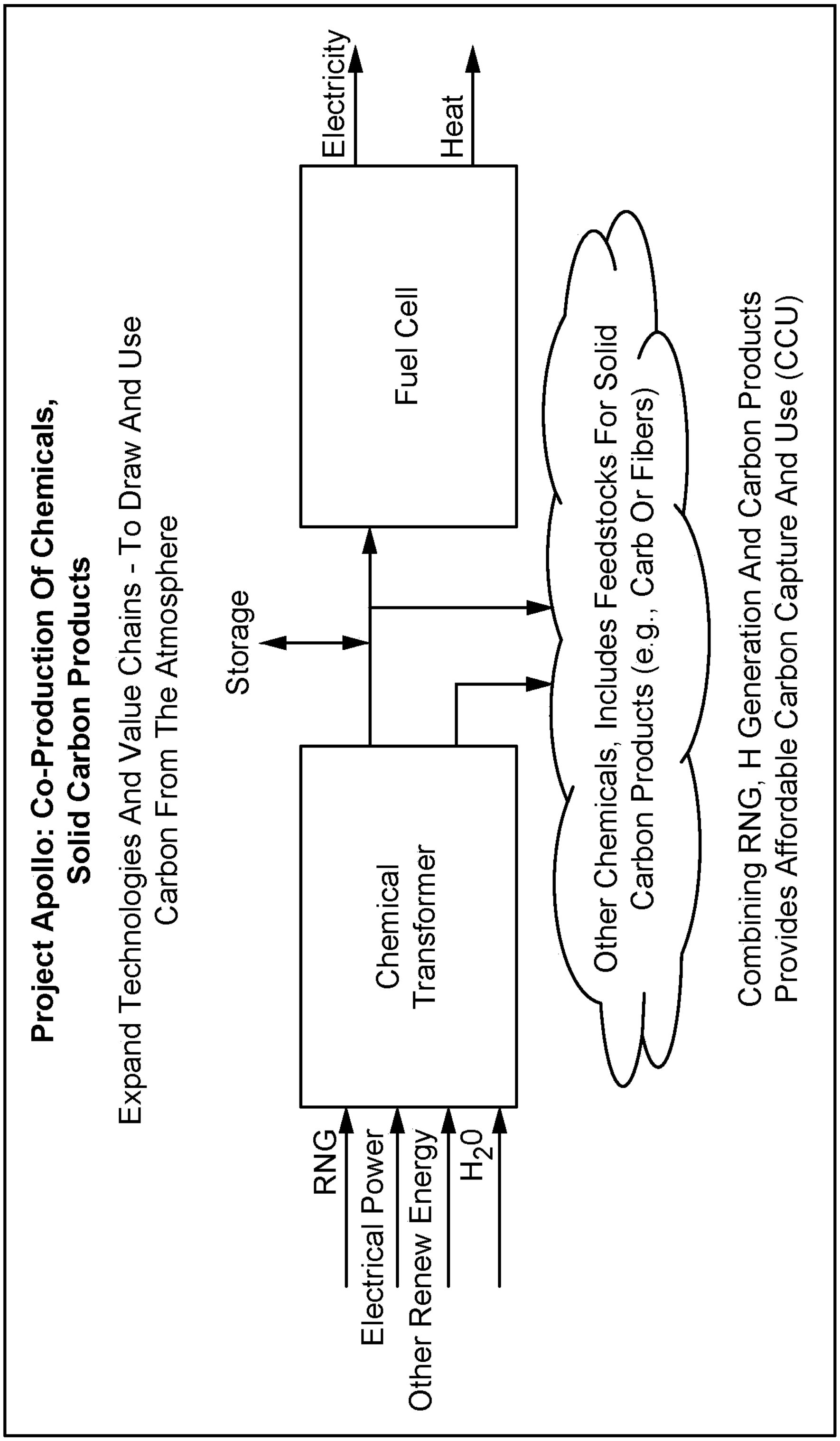
FIG. 8 is a schematic illustration showing uses of a chemical transformer.

With reference to FIG. 8, by using renewable natural gas as the hydrocarbon feedstock, the carbon content of which started out as atmospheric $CO_2$, the resulting $H_2$ product has no associated fossil carbon emissions. In some preferred embodiments, excess renewable energy produced during periods of, for example, high sunlight or wind, can be used to generate $H_2$ which can be used immediately or stored for later use. Secondly, chemicals like methanol and/or dimethyl ether, carbon products can be co-produced along with hydrogen. This additional production can be accomplished with additional reactions and separations.

We also designed a chemical transformer to provide shifted syngas (reformate) based on the use of six Steam Methane Reformers (SMRs), six High Temperature Recuperative (HTR) heat exchangers, two adiabatic Water-Gas Shift reactors with an intermediate heat exchanger between them, plus steam generators and a water condenser heat exchanger. The system is designed to support the production of up to 200 kg $H_2$ per day based on the downstream inclusion (not shown) of a $H_2$ separator/purifier (such as a Pressure Swing Adsorption unit [PSA]), with a tailgas from the PSA that contains $CO_2$, unreacted $CH_4$, $H_2$ and additional constituents in smaller quantities (e.g., CO, $H_2O$, etc).

Figure 9:
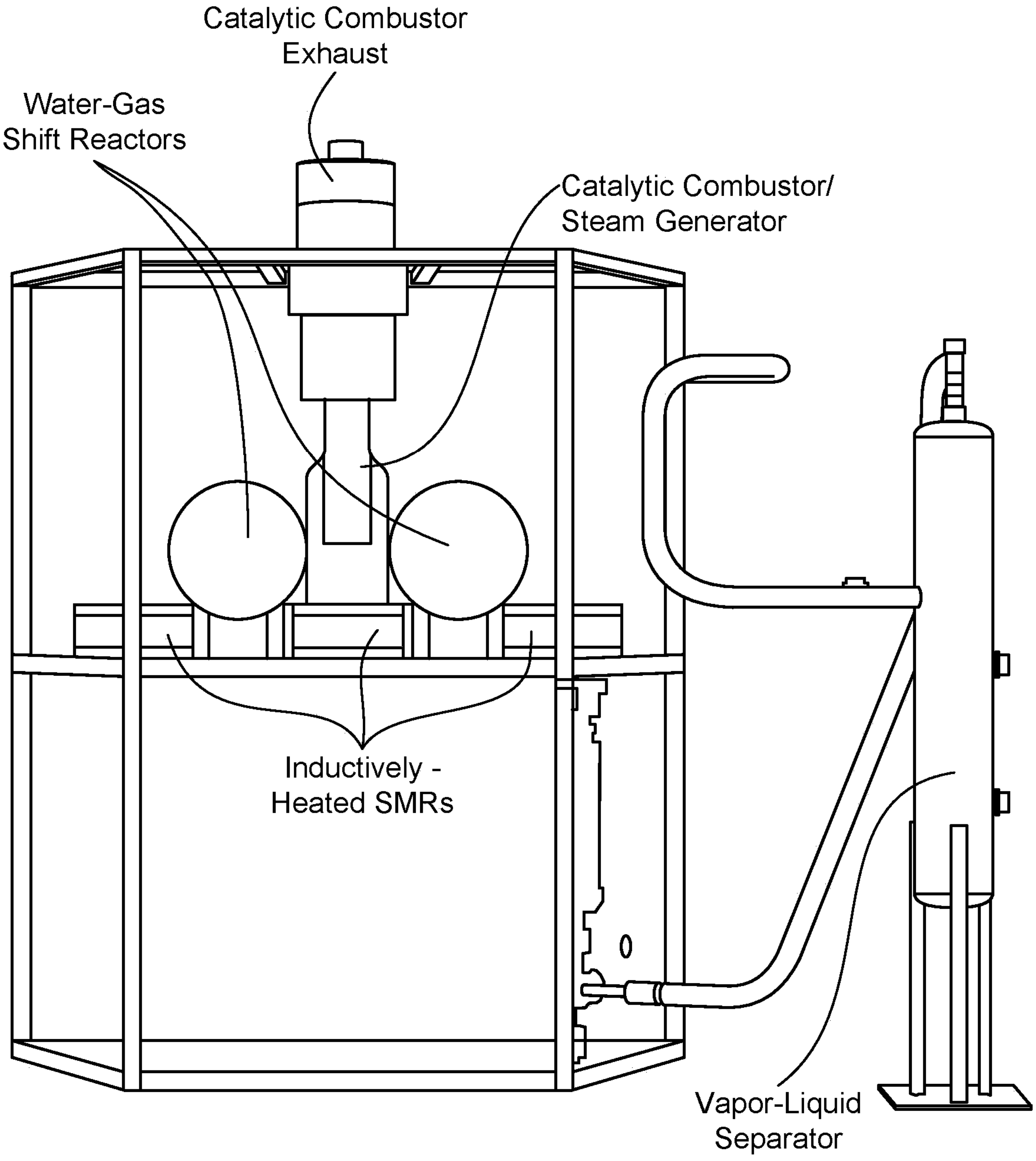
FIG. 9 is a schematic illustration of a chemical transformer comprising a plurality of components in a half-hexagonal housing.

FIG. 9 is a partial rendering from the Computer Aided Design (CAD) showing half of the irregular HEX structure. To achieve the full HEX, a second HEX is added, yielding a six-sided system. The upper half of the HEX, includes three radial-designed SMRs with a HTR above each, plus other elements of the system include valving, sensors, piping/tubing, etc. To the right of the Half-HEX is a vertical tank that provides vapor-liquid separation of water from the shifted-syngas product, prior to being routed to downstream processing outside of the HEX, such as to a PSA system for $H_2$ separation and purification. In this embodiment, steam is produced by catalytic combustion of the PSA tailgas. In another embodiment (not shown), steam is produced using electrical heating.

In the apparatus illustrated in FIG. 9, internal to the Half-HEX within its upper half are three SMRs with inductive heaters on each side, three HTRs above the SMRs, two adiabatic WGS reactors with an intermediate heat exchanger, plus various tubing, sensors, etc. On the lower half, an air blower that provides air for catalytic combustion of tailgas, producing heat for steam generation, a water pump, and other components including mass flow controllers for water and methane. At the very top is the combustion gas exhaust column. Side panels and insulation are not shown. In this embodiment, the footprint is that of an irregular hexagon, with the long axis being approximately 5.6 feet and the short axis, which includes the second half-HEX, of approximately 4 feet, yielding a total footprint for the complete HEX of about 20 square feet. The breakdown of the system into two half-HEXs facilitates assembly, for example using mass production methods including assembly lines, and transport to a site for operation. Additionally, the two half-HEXs can be pulled apart at the operating site, facilitating easier access for maintenance and startup testing.

The system is designed to be assembled into a skid structure that, from above, appears to be an irregular hexagon. However, any structure can be used. The SMRs are designed to be heated electrically, such as through the use of induction heaters, rather than by combustion of the tail gas or another combustible material, as is generally done in the industry. This allows us to use photovoltaic solar panels to heat our SMRS in parts of the world where this is a good solar resource. Alternately, any other source of electricity can be used, including electricity from an electrical grid.

This configuration creates the ability to convert excess electrical energy to the hydrogen and when there is need for extra energy on the electrical grid the hydrogen can be used to power a fuel cell or another power generator, including heat engines (e.g., gas turbines, Stirling or Otto Cycle engines). In this way we have created an electrical-chemical transformer that amplifies the energy of the methane. For example, the Higher Heating Value of methane is about 55.5 mega-Joules per kilogram (of $CH_4$). 2 kg of methane are needed to make one kg of hydrogen which has a Higher Heating Value of 141.7 mega-Joules (per kg $H_2$). That is an increase in the overall Higher Heating Value in the reacting stream of slightly more than 27%. This is possible because the energy provided by adding electricity to heat the high temperature, endothermic methane reforming reaction increases the fuel energy of the reacting stream.

The system can also be considered an amplifier of electrical energy. Based upon the Heats of Reaction for the SMR and Water-Gas Shift (WGS) reactions, and depending upon the efficiency of induction heating and the extent to which the WGS reaction occurs in the SMR, we can estimate that the electricity consumed by an inductively-heated SMR to produce 1 kg $H_2$ may be in the neighborhood of 10 kilowatt-hours (kWh). If that hydrogen is converted using a fuel cell it will produce about 22 kWh of electricity assuming about 55% efficiency. Other peripherals in the system will, of course, consume electricity, but the point is made that net electricity can be produced.

Finally, the system can be used to make water where it is needed because it makes more water than it consumes. For example, for every kilogram of water used in the SMR and WGS combination, a downstream fuel cell can be expected to produce up to 2 kg of water vapor; this makes the SMR/Fuel Cell process a water amplifier as well.

The hydrogen generation industry has relied on the economics of large scale to reduce the cost of production. The economics of hardware mass production will reduce the cost of the hydrogen produced by chemical transformers. For example, a 200 kg per day SMR chemical transformer (excluding control panels, de-sulfuring, de-ionizing water, and pressure swing adsorption) can be assembled that has a footprint of about 2 meters. Alternately, further stacking the SMRs within a chemical transformer would enable nine of the designed SMRs in an area of approximately 1 square meter, capable of producing more than 300 kg of hydrogen per day. The modularity of the design allows the production of hydrogen on-site anywhere there is the infrastructure for methane, water and electricity.

Process Intensive Micro- and Meso-Channel SMR Reactor Testing

Figure 13:
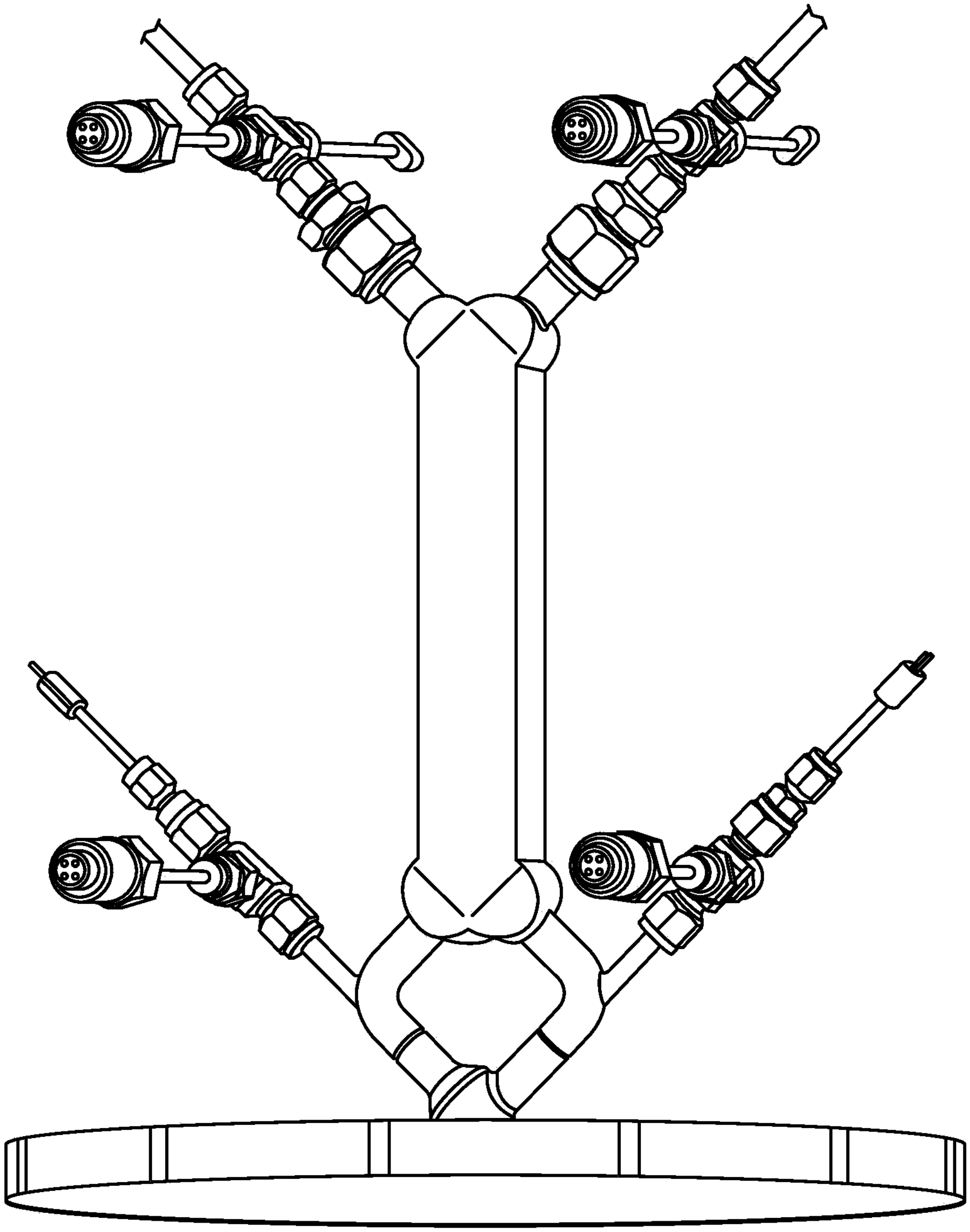
FIG. 13. CAD drawing of the $H_2$ production module including SMR reactor (bottom), HTR heat exchanger (top), and thermocouples and pressure transmitters. The induction coil (not shown), is placed beneath the reactor, with a layer of insulation disposed between the induction coil and the reactor wall.

A steam methane reformer (SMR) reactor was fabricated using the additive manufacturing process called selective laser melting (SLM) or laser powder bed fusion (LPBF). The diameter is approximately 11 inches and the thickness is less than 1 inch. The structure in the center on top has two openings, one channel for flowing reactants, methane and steam, into the reactor and one channel for product reformate gas to flow out of the reactor. The groove around the perimeter is used for electro-discharge machining (EDM) to remove the outer ring. Metal foam structures coated with SMR catalyst are inserted into the catalyst channels. The ring is replaced around the perimeter and welded in place to seal the reactor except for the inlet and outlet channels on top. This type of reactor is described in U.S. Pat. No. 9,950,305 with the reaction channels being straight and the return channels (heat transfer channels) being curved, therefore providing counter-cross flow heat exchange from the return channels to the backside of the reaction channels. A hydrogen production module is completed by attaching a high temperature recuperative heat exchanger to the inlet and outlet channels, as shown in FIG. 13. The recuperative heat exchanger transfers heat from the hot product gas stream to the incoming cold reactant gas stream in order to make a more energy efficient and productive hydrogen production module.

The reactor is heated from the bottom side from a pancake induction coil. Alternating current electricity passing through the inductor creates a magnetic field that induces mirror currents in the adjacent reactor. The reactor rested on top of a commercial induction coil rated for 5 kw power.

The SMR reactor operates at temperatures near the exit of the process channels in excess of 750° C., or 800° C. or more, or between 750 and 900 or 950° C. Since the coil would be damaged at typical SMR temperatures, insulation is placed between the induction coil and reactor. The coil can be cooled by convectively flowing air across the side of the coil opposite the reactor, or alternatively, by placing a cold plate against the coil. One example of a cold plate is an aluminum block with cold water flowing through channels or tubing embedded in the aluminum. The configuration used 1.2 cm of insulation between the coil and reactor and cooling of the coil with air flow.

These test results illustrate the importance of using the reactor body as a moderator of temperature for the CoFe, the magnetic susceptibility of which falls as the Curie Temperature is approached. By gaining good thermal contact between the CoFe and the reactor, the temperature of the CoFe is limited to approximately a slightly greater temperature than the reactor surface, which should in all areas of the reactor be less than 900° C.

Experimental Configuration 1

An innovation to promote inductive coupling between the induction coil and the reactor was to add another layer of material acting as an induction enhancer that is ferromagnetic between the coil and the reactor. A sheet approximately 0.35 mm thick of Cobalt-Iron (FeCo) was inserted between the insulation and the SMR reactor and affixed to the reactor with a thermal paste that cures into a ceramic material compatible with the reactor temperatures. The Curie temperature of the Cobalt-Iron material is approximately 950° C. where it undergoes a phase change and transitions from ferromagnetism to paramagnetism.

The initial campaign tested the reactor at varying temperatures while maintaining a methane flow rate of 9 SLPM, a pressure of 132 psig, and 3:1 steam to carbon ratio. Methane conversion as a function of reactor temperature, which here is the average of 12 thermocouples located around the perimeter of the reactor, closely tracked equilibrium conversion (within 3%) indicating that the reactor is equilibrium limited and has higher potential production capacity. This is expected because the flow rates for this test were approximately one third of reactor design flow rate. Testing at full design flow is constrained by the induction heating capacity of the test unit as explained above. Likewise, the fraction of methane converted to $CO_2$ and the equilibrium mole fraction, were also equilibrium limited at these test conditions. The electrical-to-thermal efficiency of the induction process was between 50 to 52% at an induction heater power between 1.85 and 2.45 kW. Electrical-to-thermal efficiency is the efficiency of converting power to additional overall energy in the reacting stream, defined as the change in enthalpy between the SMR inlet and outlet streams divided by the power consumed by the induction heating system. A similar metric, called the electrical-to-chemical efficiency, which is the change in higher heating value (HHV) of the stream divided by the induction power, was measured to be 58% to 62% at an induction heater power between 1.85 and 2.45 kW. Electrical-to-thermal efficiency is consistently above 50% in this test, and the conversion to higher heating value was around 60%. The thermal efficiency can be compared with the prior reported energy efficiency of 10 or 23% as reported by Amind et al., Catalysis Today, pp. 13-20 (February 2020), which supports our belief that our invention is a considerable improvement over tests of state-of-the-art, inductively-heated steam-methane reformers.

Figure 14:
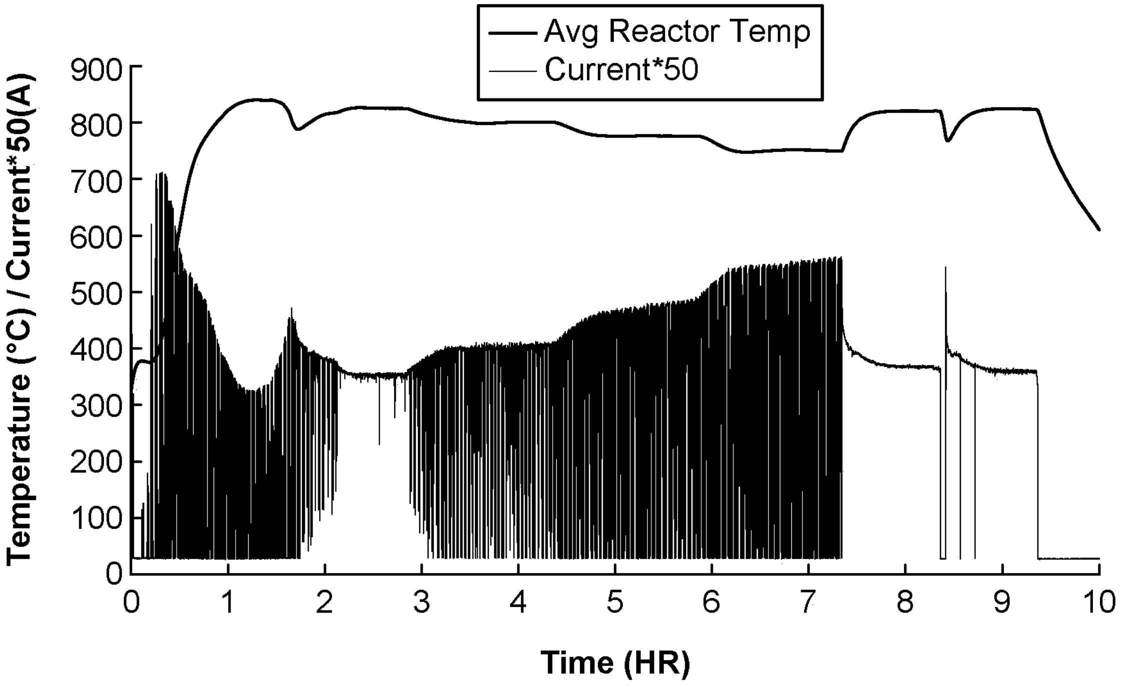
FIG. 14. Average reactor temperature in ° C. and current times 50 in Amps from first campaign.

The average perimeter temperature is plotted with induction power current in FIG. 14. Reactor temperature is controlled by pulse width modulation of the induction power. This means that the induction power is turned on and off and is therefore only on for a fraction of a given time pulse. Therefore, the current in FIG. 14 oscillates between zero and the maximum power draw along the top of the current data. The data show that to heat the reactor to 800° C. at these conditions, the induction system is fully on and is only drawing about 7 amps of power out of the maximum of about 13 amps. As the reactor temperature decreases in steps to 750° C., the maximum power draw is increasing. Since the Cobalt-Iron (Co—Fe) sheet has a Curie temperature of 950° C., it implies the sheet is much hotter than the perimeter of the SMR reactor. This is expected if there is an air gap between the Co—Fe sheet and the reactor creating thermal resistance for heat transfer from one to the other and reduced opportunity for eddy currents to flow from the Co—Fe induction adaptor into the reactor. Delamination of the Co—Fe sheet from the reactor was observed after testing. Possible causes include residual stresses in the Co—Fe sheet causing warpage as the material is heated, as observed in earlier heating tests of the Co—Fe sheets alone, or due to a mismatch in coefficient of thermal expansion (CTE) between the Co—Fe material and the Haynes reactor wall.

Experimental Configuration 2

Figure 15:
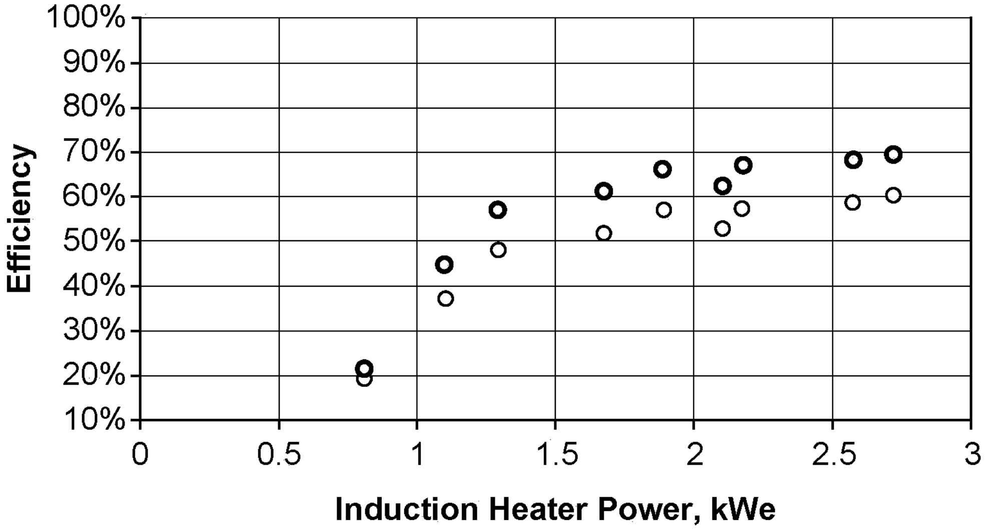
FIG. 15. Electrical-to-thermal efficiency of the inductively-heated SMR reactor (●) and electrical-go-chemical efficiency of converting power to increase the higher heating value of the product gas (x) with the new copper-silver braze material.

The thermal paste that forms a rigid ceramic material was replaced with a braze consisting of 98% copper and 2% silver to provide more ductility and compliance in the braze joint to accommodate the CTE mismatch. Running the reactor with the new braze material resulted in the results shown in FIG. 15. The electrical-to-thermal efficiency of the SMR increased from slightly over 50% in the first tests to over 60%. The methane flow rate was reduced to as low as possible in order to determine the minimum energy losses from the system. While efficiency improved with the new copper-silver braze, portions of the Co—Fe still delaminated from the reactor during operation, as observed after testing.

Experimental Configuration 3

Figure 16:
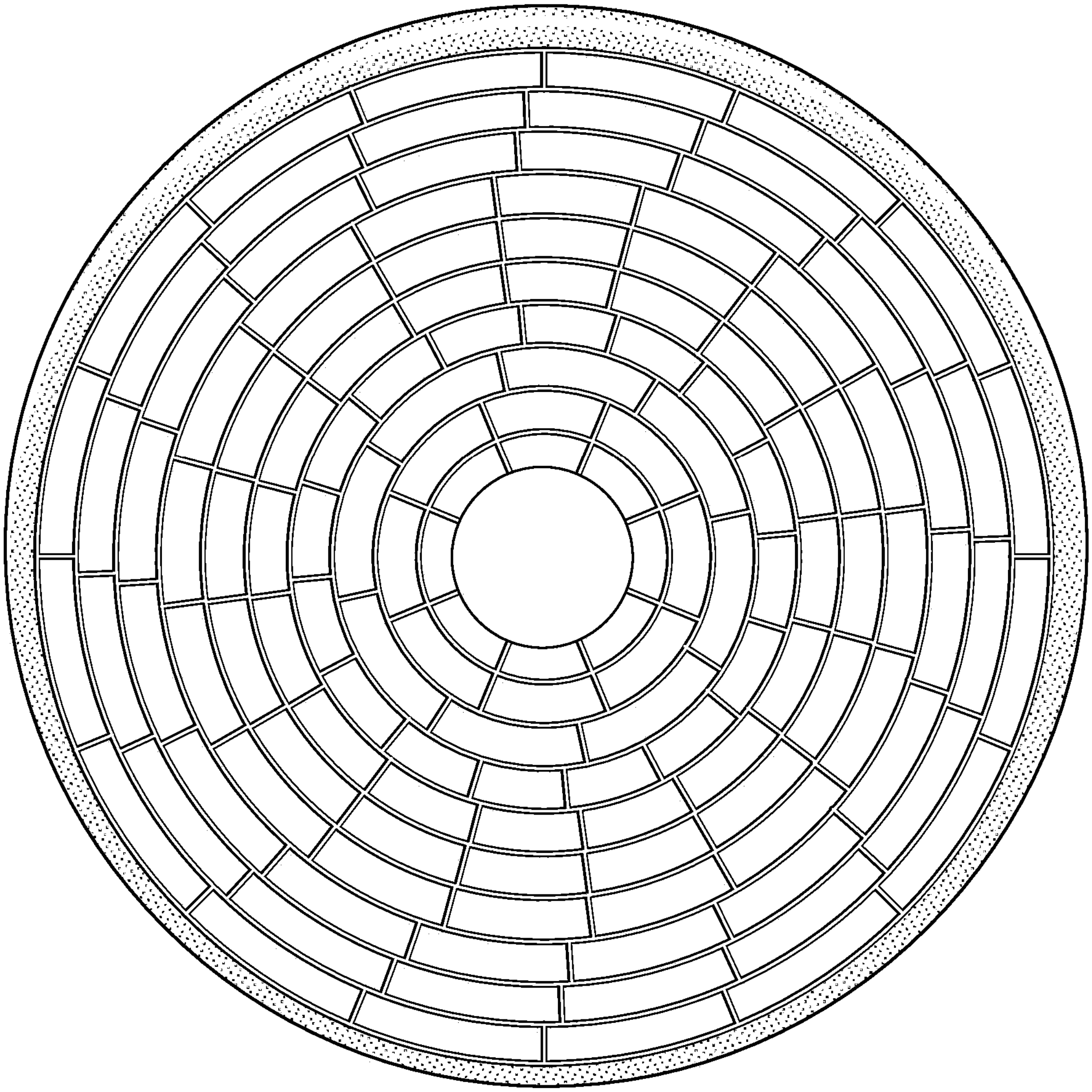
FIG. 16. Two-layer SMR reactor with cobalt-iron circular segments brazed on with 98% copper, 2% silver braze. This is representative of the general concept of using a plurality of pieces of inductive enhancers bonded via a metallic braze to a processor wall.
Figure 17:
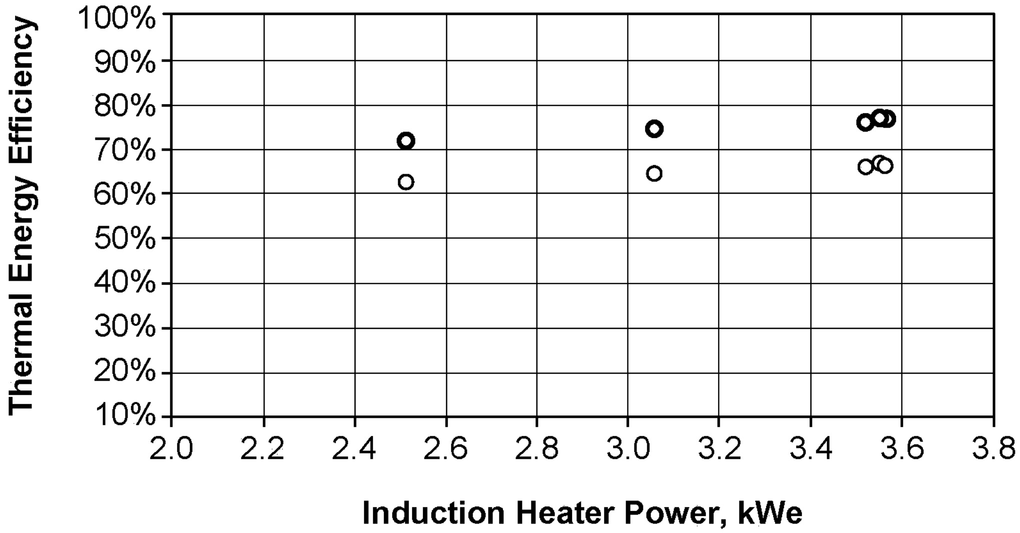
FIG. 17. Graph of electrical-to-thermal efficiency of the SMR reactor (●) and electrical-to-chemical efficiency of converting power to increase the higher heating value of the product gas (x) with circular segments of cobalt-iron sheet attached with copper-silver braze material.

The next attempt was to reconfigure the cobalt-iron sheet into an improved, engineered induction enhancer, producing circular segments that were then brazed onto the reactor wall with the copper-silver braze as shown in FIG. 16. In addition, a high temperature paint was applied to the surface in order to protect the cobalt-iron from oxidation in air. Attaching smaller pieces of cobalt-iron reduces the overall lateral expansion of the material thereby improving the ability of the braze to support the relative movement of the cobalt-iron and Haynes reactor during thermal expansion. FIG. 17 shows the resulting efficiencies in operating the reactor in Figure FIG. 16. The achievable power level increased from about 2.7 kW to almost 3.6 kW, the electrical to thermal efficiency increased from a maximum of 60% to 66% and the electrical-to-chemical efficiency increased to above 75%. Inspection of the reactor surface after testing showed that some of the circular segments had delaminated and others were loosely attached.

Experimental Configuration 4

Figure 20:
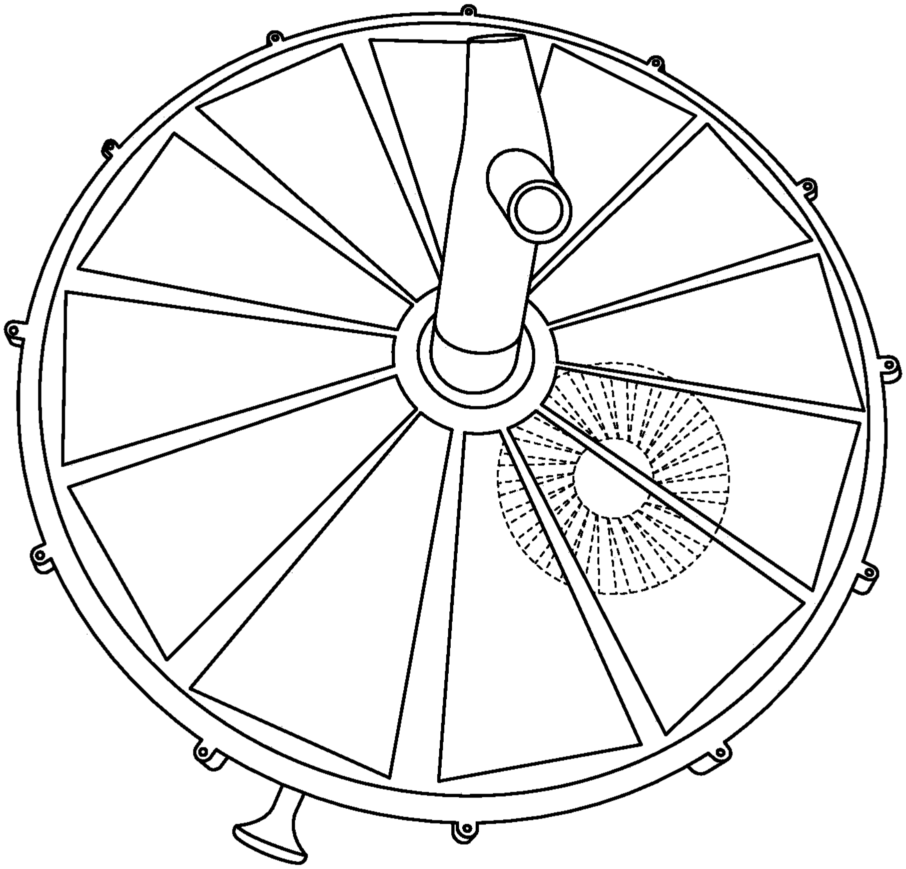
FIG. 20. Photo of SMR reactor with radial segments of nickel-coated CoFe attached.

Yet additional innovations to inductively heating an SMR were tested, with innovations as follows: Twelve trapezoidal pieces of 0.5-mm-thick cobalt iron were first coated with nickel using an electroless plating process to protect them from oxidation during operation and also to promote brazing to the reactor. The pieces—also called "radials"—were then attached to the bottom of the SMR reactor, as shown in FIG. 20, by brazing with BNi7 braze paste. The use of trapezoidal pieces provided gaps to reduce stresses associated with thermal expansion mismatch of materials and additionally provide an opportunity for eddy currents, which will tend to run across the perimeter of the radials, to "leak" through the braze into the SMR, adding to induced currents and joule-heating in the SMR.

Figure 21:
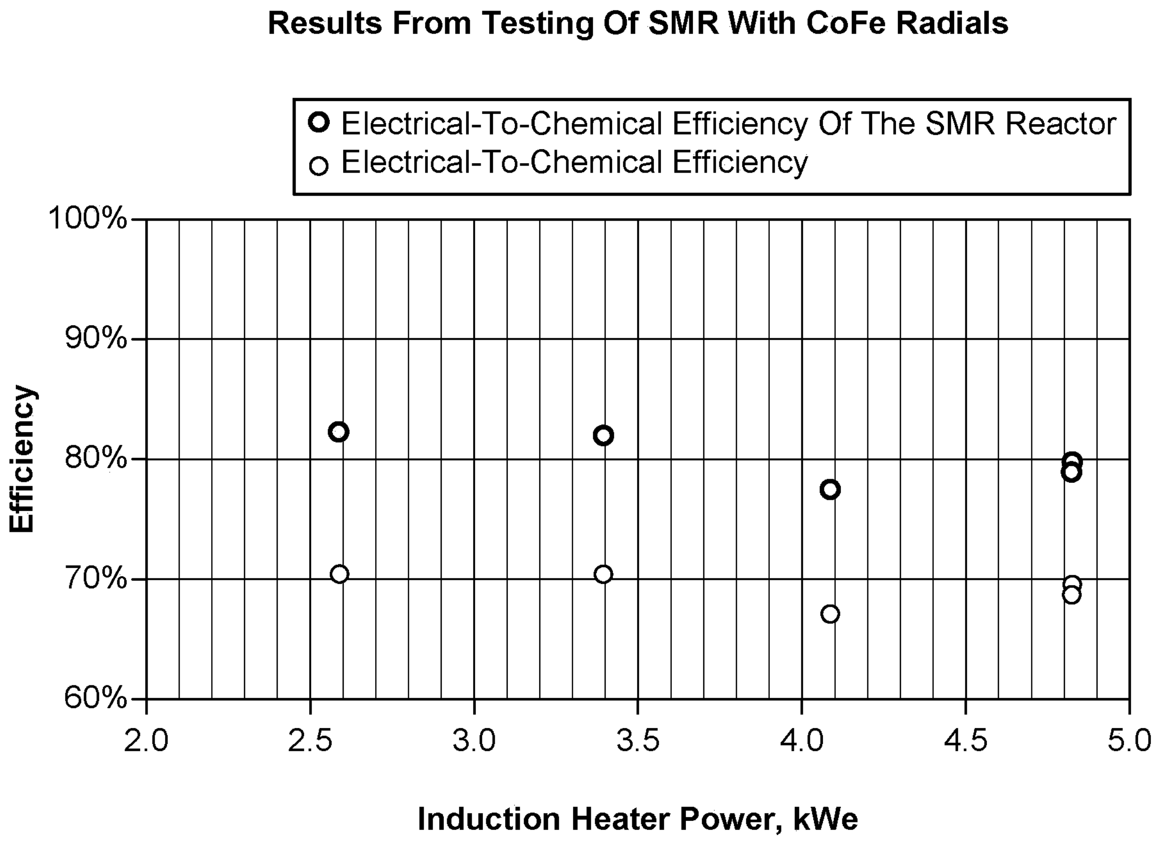
FIG. 21. Graph of electrical-to-thermal efficiency of the SMR reactor (●) and electrical-to-chemical efficiency of converting power to higher heating value of the production gas (x) with radial segments of nickel-coated cobalt-iron brazed to the reactor.

The efficiency of the reactor in converting electric power to thermal and chemical energy is plotted in FIG. 21. Electrical-to-thermal efficiencies for this configuration reached higher than 70% and electrical-to-chemical efficiencies included cases exceeding 80%. The induction heater power, operating conditions, and methane conversion are shown in Table 1. Again, these extremely high efficiencies for inductively-heated, steam-methane reformers, which are substantially greater than the highest (23%) that we have otherwise seen in the technical literature, support our belief that we have succeeded in a substantial improvement by adapting micro-/meso-channel reactors so that they can be inductively-heated with very high efficiencies.

TABLE 1

Induction heater power input, operating conditions, and methane conversion inductively-heated SMR with CoFe radials

| Induction Heater Power (kWe) | Methane mass flow (SLPM) | Steam to Carbon ratio | Average temperature (° C.) | Pressure (bar) | Methane conversion |
|---|---|---|---|---|---|
| 2.6 | 16 | 3.0 | 749 | 8.3 | 77% |
| 3.4 | 22 | 3.0 | 747 | 8.4 | 73% |
| 4.1 | 26 | 3.0 | 746 | 8.1 | 71% |
| 4.8 | 29 | 3.0 | 762 | 7.6 | 76% |
| 4.8 | 30 | 3.0 | 758 | 7.5 | 75% |

We believe that higher efficiencies would have been obtained if not for a leak that detected at the perimeter of the reactor after testing, immediately downstream of the catalyst channels and at the point where fluid temperatures will tend to be highest. This allowed an unknown fraction of the reaction stream to release from the reactor and not flow through the return channels to the reactor outlet. As the return channels provide recuperation of heat from the product gas into the reaction channels, supporting the endothermic reaction, the sensible energy of the leaked reaction products undoubtedly had a deleterious effect on energy efficiency. Consequently, a fully functioning reactor without leaks is expected to have even higher energy efficiency. We believe the electrical-to-chemical efficiencies might have reached as high as 84-85% if not for the leak.

Figure 22:
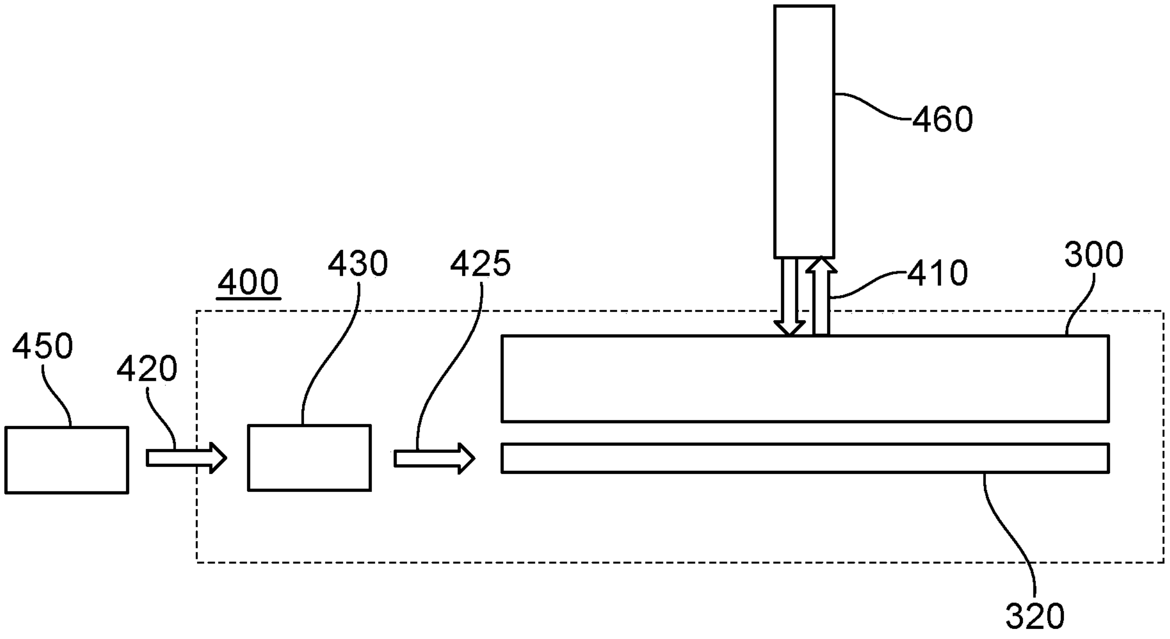
FIG. 22. Graphical depiction of the measure points for calculating the electrical-to-chemical efficiency and the thermal-to-chemical efficiency.

FIG. 22 graphically identifies the measuring points for calculating the electrical-to-thermal and electrical-to-chemical efficiencies. Here, the intention is to determine the efficiencies for the inductively heated processor, meaning a reactor, heat exchanger or separator receiving heat from an inductor. Dotted line 400 identifies what is "inside the box" and what is outside. In this case, for steam methane reforming, the SMR (300) is inductively heated by copper coil (320), which is supplied with electricity via electric cables (425) from power electronics box (430) which converts grid electricity to DC and then AC at about 25 kHz. Power electronics box (430) is supplied grid electricity through electric cables from a transformer, circuit panel, or another source; the electricity into the system is taken at cable (420). Thus, electricity losses from cables, the power electronics box (430) and the copper coil (320 are all losses that reduce the electrical-to-thermal and electrical-to-chemical efficiencies. Electrical losses outside the dotted-line "box" (400) are not considered losses in this calculation. For the thermal and chemical energy associated with the reacting stream, measurements are taken to determine the increases in thermal energy and Higher Heating Value at the entrances and exits (410) to the SMR. Losses include heat loss from the SMR (300) but do not include losses or inefficiencies associated with the High Temperature Recuperator (460) which is "outside the box". Note that some of these measurements may be taken at different points which are still representative (e.g., gas compositions) and allow reasonable calculations for the performance of the inductively-heated chemical processor.

Inductively-Heated, Three-Layer SMR

In this section, we describe an overall package design for an inductively-heated, three-layer SMR. The three layers within the SMR are two process layers sandwiching a heat transfer layer. An induction enhancer may or may not be included as some unit processes may not need the induction enhancer. For example, steam generation at modestly hot temperature (e.g., 200° C. or less) can easily be conducted at temperatures where the process unit is made of a ferromagnetic alloy (e.g., magnetic stainless steel) and the operating temperature may not require insulation between the reactor body and the induction subsystem.

Figure 18:
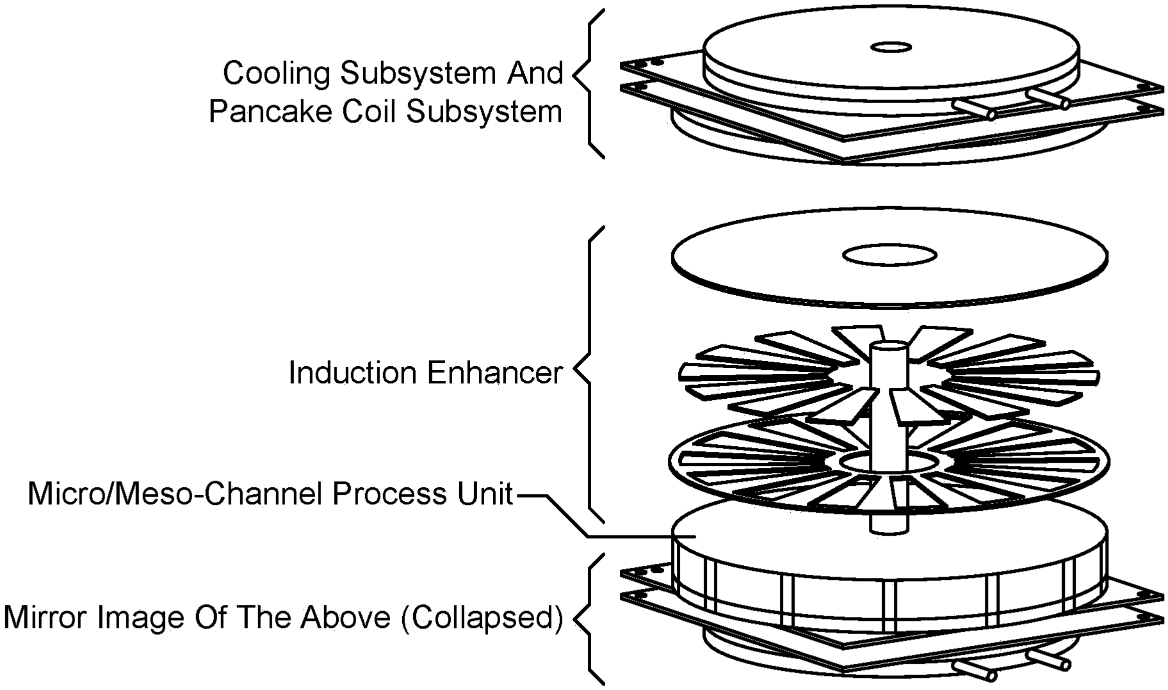
FIG. 18 shows an exploded view of induction subsystem of a three-layer, micro/meso-channel process unit.

FIG. 18 shows an exploded view of induction subsystem of a three-layer process unit—with an induction enhancer which may have been needed because the process unit is made of a material that does not have a high relative magnetic permeability (e.g., a paramagnetic, ferrimagnetic or non-magnetic substance). Or it might be required because the process unit operates at a temperature necessitating a gap, with insulation, between the process unit and the induction coil. From top to bottom, the induction enhancer in this image consists of a spacer plate made of a suitable material (e.g., Inconel); a material that has a high relative magnetic permeability (preferably a ferromagnetic material, such as CoFe); and another spacer plate that, in this image, has been machined to fit CoFe that is configured as radial units in the induction enhancer sandwich. Alternately, the ferromagnetic material may be configured in a number of possible geometries, including concentric rings, segmented concentric rings, tiled units, etc., and they may be in close proximity or overlapping one another. The induction enhancer sandwich may be in close proximity to the process unit or may be in direct contact, for example it may be affixed and in good thermal and electrical contact through the use of a paste, a brazing material, spot welding, or any other suitable method. In this case, the induction enhancer sandwich may additionally act to isolate the ferromagnetic material from air to prevent oxidation. Note that in joining the components of the sandwich, care must be taken to prevent problems associated with different thermal expansion coefficients. Accordingly, expansion joints and other expansion mitigations may be included in the design and assembly of the induction enhancer sandwich. Note also that the induction sandwich may additionally include components that protrude from the sandwich or into the process unit.

Figure 19:
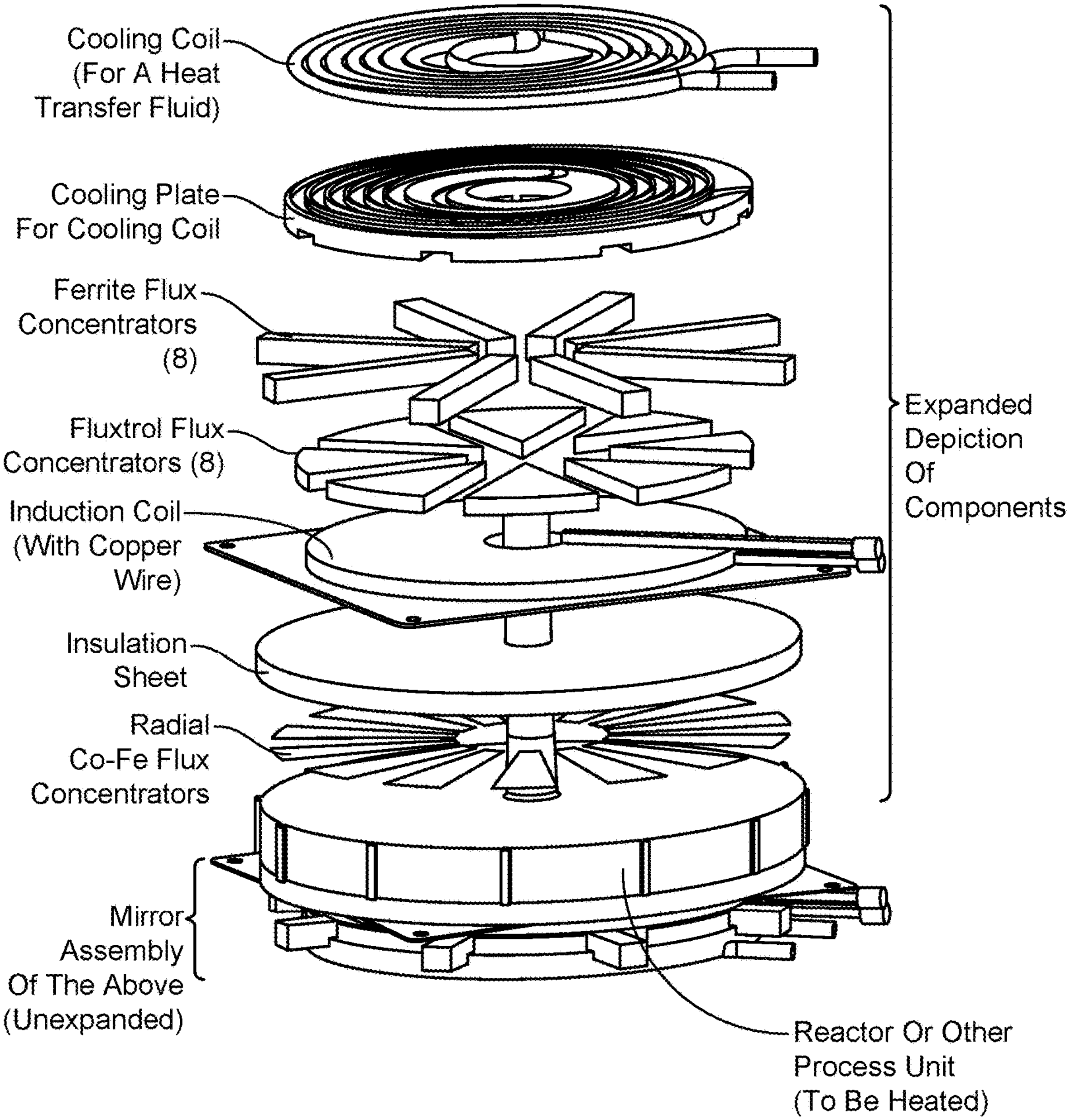
FIG. 19 shows an exploded view of an alternative induction subsystem of a three-layer process unit.

FIG. 19 shows an exploded view of another configuration of an induction subsystem for a three-layer process unit—with no spacer plates. Also, the flux concentrators between the induction coil and the cooling plate have been reconsidered: There are now eight Fluxtrol flux concentrators (which have high thermal conductivities and modest magnetic permeabilities) and eight Ferrite flux concentrators (which in comparison have high magnetic permeabilities and modest thermal conductivities). This change maintains strong cooling for the induction coil while increasing the amount of magnetic energy that is diverted from the direction of the cooling plate and instead is directed around the induction coil toward the CoFe radials and the processor.

What is claimed:

1. A chemical processor, comprising, in order from top to bottom:

a layer comprising a plurality of flux concentrators;

an inductor configured to generate an alternating magnetic field in the top wall of the process layer;

a process layer having a top wall comprising an induction enhancer that is adapted to heat in response to an alternating magnetic field, a bottom wall opposite the top wall, and side walls disposed between the top and bottom walls;

the process layer comprising a channel adapted for fluid flow and an inlet and outlet adapted for fluid flow into and out of the process layer;

a heat transfer layer adjacent the bottom wall of the process layer;

the heat transfer layer having a top wall, a bottom wall opposite the top wall, and side walls disposed between the top and bottom walls;

the heat transfer layer comprising a channel adapted for fluid flow and an inlet and an outlet such that a fluid can flow into and out of the heat transfer layer;

wherein the outlet of the process layer is connected to the inlet of the heat transfer layer such that a fluid can flow out of the process layer and into the heat transfer layer;

wherein the bottom wall of the process layer is the top wall of the heat transfer layer or where the walls are in thermal contact.

2. The chemical processor of claim 1 comprising an insulation layer disposed between the inductor and the process layer.

3. The chemical processor of claim 2 wherein the layer of insulation has a thickness in the range of 0.5 to 2 cm.

4. The chemical processor of claim 1 wherein the induction enhancer comprises a cobalt iron alloy.

5. The chemical processor of claim 4 wherein the cobalt iron alloy comprises cobalt iron flux concentrators that are coated with a metallic or ceramic oxidation-resistant coating.

6. The chemical processor of claim 4 wherein the layer of cobalt iron alloy comprises cobalt iron flux concentrators that comprises a brazing layer having a thickness of 100 μm or less or in the range of 10 to 100 μm.

7. The chemical processor of claim 4 wherein the cobalt iron alloy comprises a layer of cobalt iron flux concentrators comprising a nickel braze.

8. The chemical processor of claim 1 wherein, during operation, flow is cross flow such that a plurality of microchannels or mesochannels in the heat transfer layer overlap with a plurality of microchannels or mesochannels in the process layer such that the channels cross, so that flow is both counter-flow and cross-flow.

9. The chemical processor of claim 1 wherein the inductor is a pancake induction coil, or a toroidal induction coil.

10. The chemical processor of claim 1 further comprising a cooling plate disposed on top of the layer comprising a plurality of flux concentrators.

11. The chemical processor of claim 10 wherein the cooling plate is sandwiched between the plurality of flux concentrators and a cooling coil.

12. The chemical processor of claim 1 further comprising an induction susceptor placed within the process channel.

13. The chemical processor of claim 1 wherein the top wall of the process layer is ferrimagnetic or ferromagnetic at room temperature.

14. The chemical processor of claim 1 wherein the top wall of the process layer is paramagnetic at room temperature.

15. The chemical processor of claim 1 further comprising a recuperative heat exchanger in which there is heat transfer between a process stream flowing toward the process layer and a product stream flowing away from the heat transfer layer.

16. A chemical processor, comprising, in order from top to bottom:

a layer comprising a plurality of flux concentrators;

an inductor configured to generate an alternating magnetic field in the top wall of the process layer;

a process layer having a top wall that is adapted to heat in response to an alternating magnetic field, a bottom wall opposite the top wall, and side walls disposed between the top and bottom walls;

the process layer comprising a channel adapted for fluid flow and an inlet and outlet adapted for fluid flow into and out of the process layer;

a heat transfer layer adjacent the bottom wall of the process layer;

the heat transfer layer having a top wall, a bottom wall opposite the top wall, and side walls disposed between the top and bottom walls;

the heat transfer layer comprising a channel adapted for fluid flow and an inlet and an outlet such that a fluid can flow into and out of the heat transfer layer;

wherein the outlet of the process layer is connected to the inlet of the heat transfer layer such that a fluid can flow out of the process layer and into the heat transfer layer;

wherein the bottom wall of the process layer is the top wall of the heat transfer layer or where the walls are in thermal contact; and wherein the layer comprising a plurality of flux concentrators comprises a plurality of flux concentrators having a relatively high thermal conductivity alternating with a plurality of ferrite flux concentrators having a thermal conductivity that is at least 10% less by mass than the flux concentrators having a relatively high thermal conductivity.

* * * * *